United States Patent
Tomsic

(10) Patent No.: US 10,194,638 B1
(45) Date of Patent: Feb. 5, 2019

(54) ROTATABLE ANIMAL GROOMING APPARATUS AND ARM

(71) Applicant: James Edward Tomsic, Montrose, CO (US)

(72) Inventor: James Edward Tomsic, Montrose, CO (US)

( * ) Notice: Subject to any disclaimer, the term of this patent is extended or adjusted under 35 U.S.C. 154(b) by 0 days.

(21) Appl. No.: 15/790,148

(22) Filed: Oct. 23, 2017

Related U.S. Application Data

(60) Provisional application No. 62/412,989, filed on Oct. 26, 2016.

(51) Int. Cl.
*A01K 13/00* (2006.01)
*A01D 3/00* (2006.01)

(52) U.S. Cl.
CPC ............... *A01K 13/00* (2013.01); *A01D 3/00* (2013.01)

(58) Field of Classification Search
CPC .................................. A01K 13/00; A61D 3/00
USPC ........................................ 119/753, 755, 756
See application file for complete search history.

(56) References Cited

U.S. PATENT DOCUMENTS

| | | |
|---|---|---|
| 3,744,457 A | 7/1973 | Heine |
| 3,896,769 A | 7/1975 | Mcgehee |
| 4,041,905 A | 8/1977 | Prager |
| 4,531,291 A | 7/1985 | Laube |
| 4,779,540 A * | 10/1988 | Dion ....................... A47B 21/03 108/95 |
| 8,505,137 B1 * | 8/2013 | Gaines, Jr. ........... A61B 6/0457 108/147 |
| 2003/0015147 A1 * | 1/2003 | Taylor .................... A01K 13/00 119/600 |
| 2005/0215878 A1 * | 9/2005 | Zan ....................... A61B 8/0833 600/407 |
| 2007/0055289 A1 * | 3/2007 | Scouten ................... A61D 3/00 606/130 |
| 2007/0131149 A1 * | 6/2007 | Mayben ................. A47B 57/00 108/97 |
| 2012/0073515 A1 * | 3/2012 | Chung ..................... A61D 7/00 119/756 |
| 2012/0085270 A1 * | 4/2012 | Schroer .................... A61D 3/00 108/140 |
| 2013/0213318 A1 | 8/2013 | Katz |
| 2014/0236045 A1 * | 8/2014 | Hadjioannou ........... A61D 7/00 600/576 |

* cited by examiner

*Primary Examiner* — Son T Nguyen

(57) ABSTRACT

Disclosed herein is a grooming arm, consisting of a clamping mechanism, a mechanical rotation apparatus, and an animal attachment arm that an animal may be secured to, that temporarily clamps to an animal grooming table. The mechanical apparatus allowing for rotation of the arm around the table while maintaining a constant pivot point (the point at which the animal is attached to the grooming arm) is concealed beneath the table and therefore largely not visible during use. The grooming arm need not permanently mount to the frame of a table unlike the prior art. The clamping mechanism allows for easy installation and removal, as well as use with any number of different table. The apparatus allowing for the rotation mounts in the clamping mechanism, and extends underneath the table to the pivot point. The swing arm attaches to the pivot point and extends out past the clamping mechanism.

5 Claims, 38 Drawing Sheets

ROTATABLE ANIMAL GROOMING APPARATUS AND ARM

CROSS-REFERENCE TO RELATED APPLICATIONS & CONTINUITY DATA

The application claims the benefit of provisional application 62/412,989 filed 26 Oct. 2016, hereby incorporated in its entirety.

STATEMENT REGARDING FEDERALLY SPONSORED RESEARCH OR DEVELOPMENT

N/A

BRIEF DESCRIPTION OF THE FIGURES AND DRAWINGS

FIG. 1A displays a conceptual diagram of key features of one embodiment of the invention herein. FIG. 1B displays a conceptual diagram of the approximate range of motion enabled by the invention herein. FIG. 1C displays a range of attachment areas.

FIGS. 4A-4D display various views of the disc(s) or rotation component of the assembly. It is shown from top, front, and side perspective views.

FIGS. 5A-5I display the attachment piece that secures the assembly to a grooming table. It is shown from top, bottom, front, back and side perspective views.

FIGS. 6A-6I show one embodiment of the entire system assembled. It is shown from top, bottom, front, back and side perspective views.

FIGS. 7A-7I show the aforementioned and described embodiment assembled and secured in place to the edge of a table.

Figure 8A:
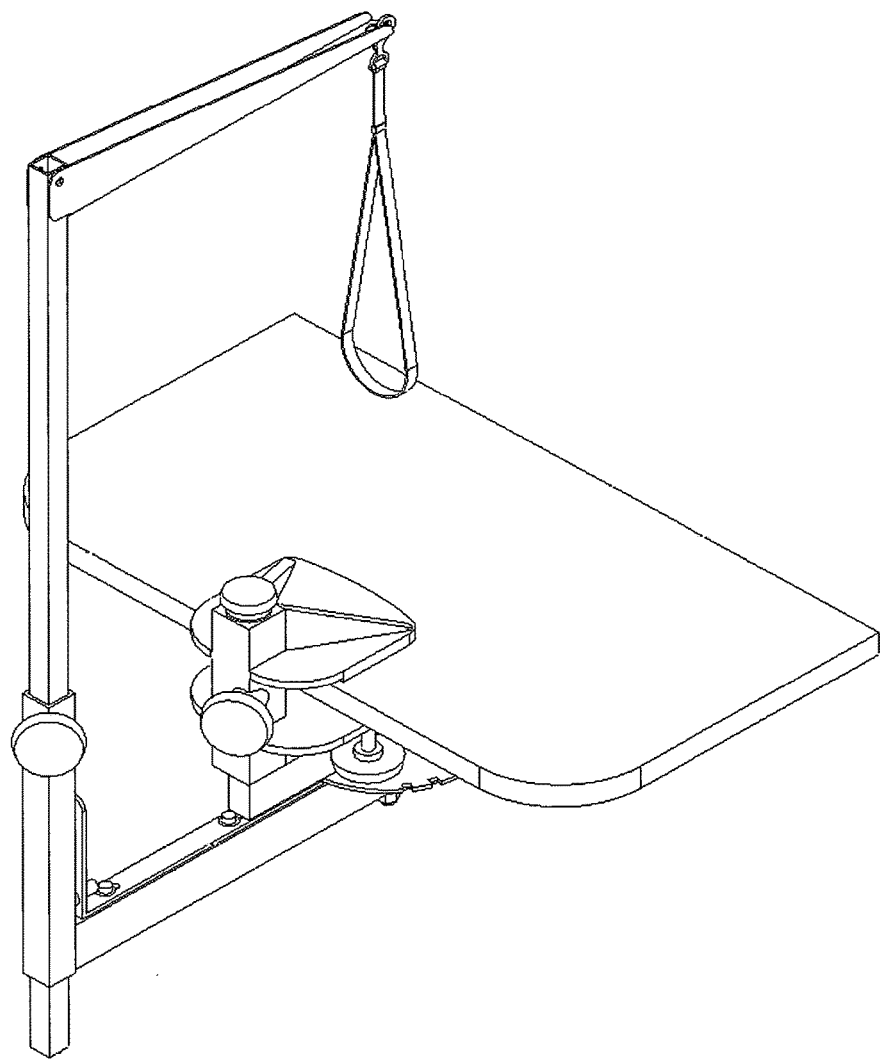
Figure 8B:
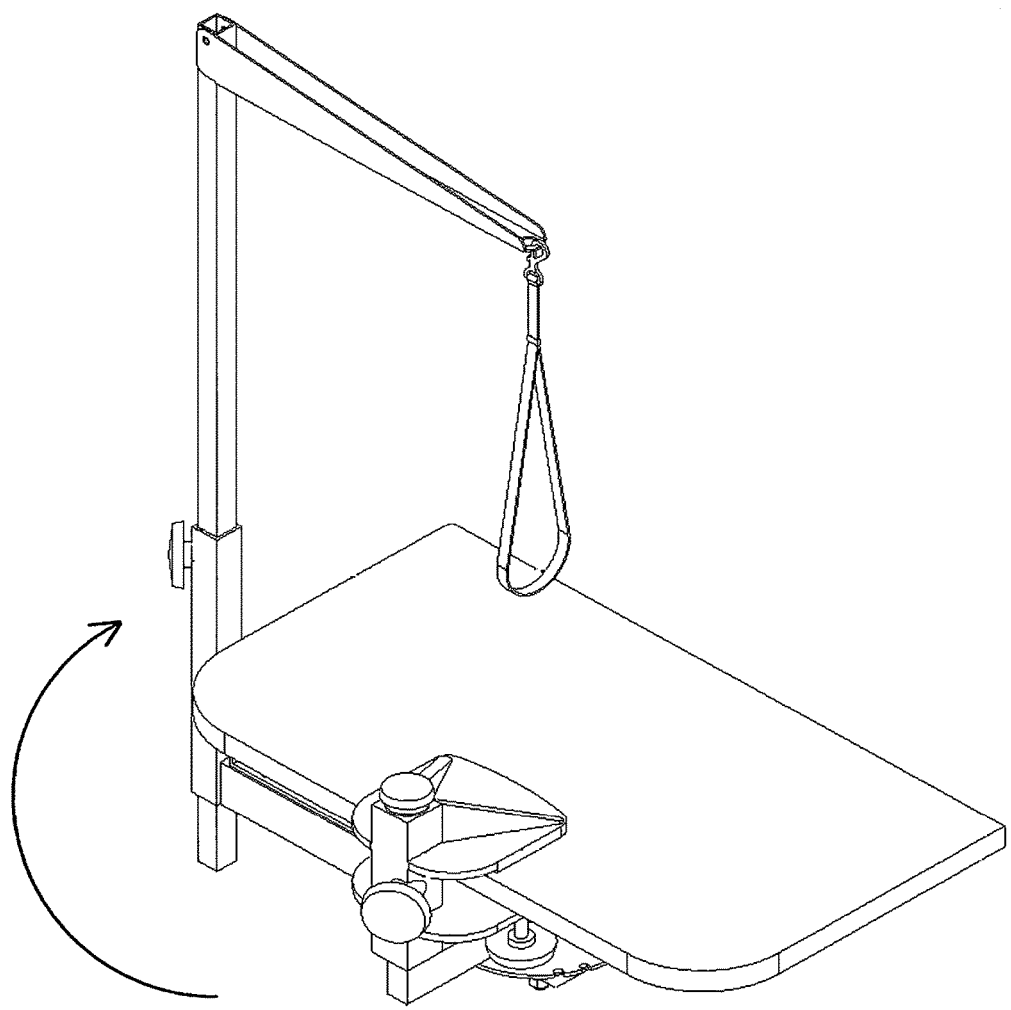

FIGS. 8A-8B show the aforementioned and described embodiment assembled and secured to a table with indications of the swing motion and range.

Figure 9A:
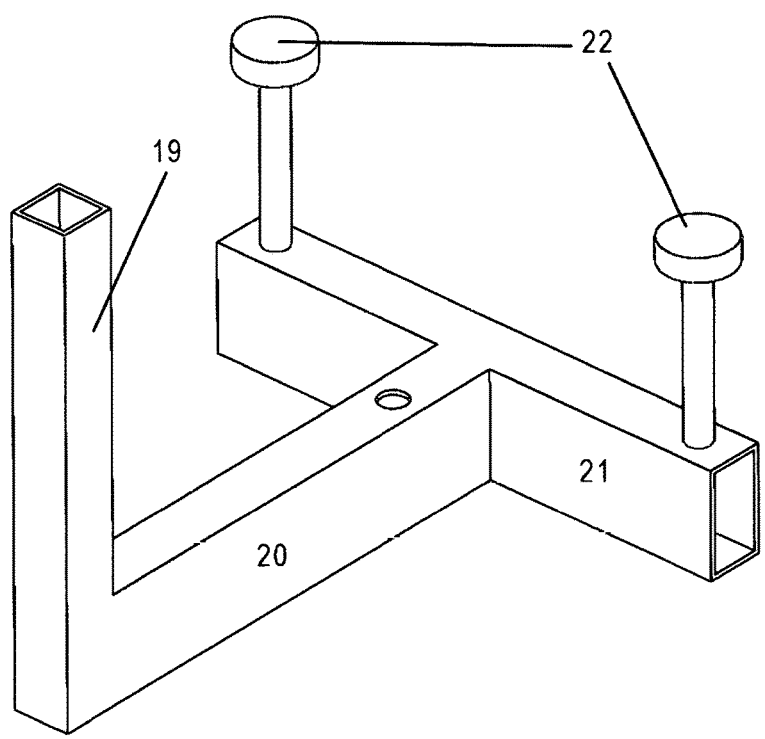
Figure 9B:
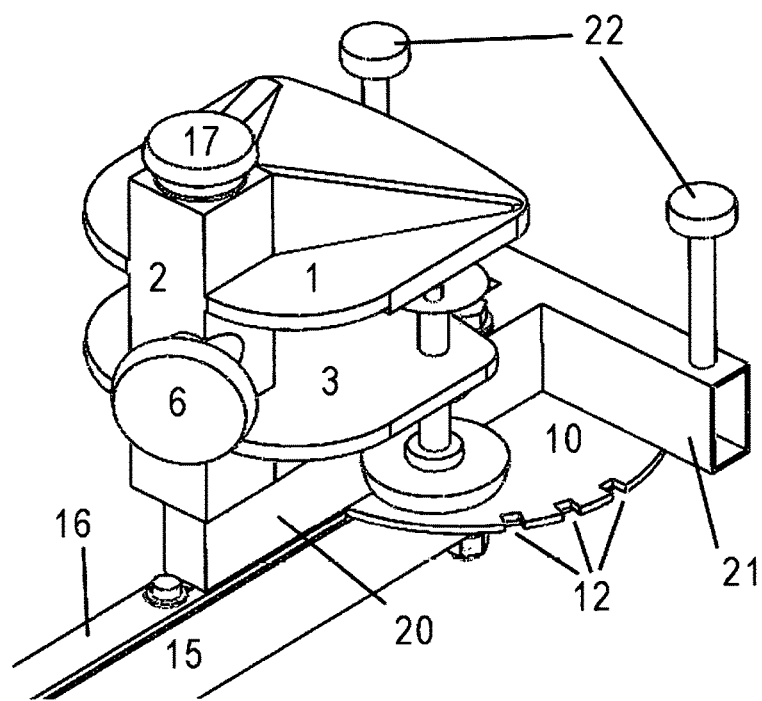

FIGS. 9A-9B display Functional Area 3 in greater detail, as described in the specification.

BACKGROUND OF THE INVENTION

Typically, when an individual is grooming a dog, either in a shop, at home, or as in the case of the dog show exhibitor, in a grooming area at a local dog show, they use a grooming table and a grooming arm that attaches to the table to hold the dog. The grooming arm, in most embodiments, is essentially an inverted L-shaped post that typically mounts to the grooming table via a grooming arm clamp, and can be adjusted up or down, in order to accommodate the size of the dog. Further, grooming tables come in various categories. Grooming shops typically utilize tables that can raise and lower the table top, either electrically or hydraulically. Some shops still use the basic non-adjustable grooming tables or manual height adjustable tables where the top is adjusted up or down by physically pinching a couple of ears, or pushing buttons on each leg. Most dog show exhibitors use these non-adjustable or manual adjustable tables, as the electric or hydraulic tables are quite cumbersome to move around.

Needed is an apparatus that would allow the grooming arm animal attachment arm to be rotated around the end of the table, allowing the animal attachment arm to be moved out of the way of the groomer while grooming the head or face, yet leaving the pivot point, where the dog is attached, to remain in the same physical location. Devices that have attempted to carry out this function mount to the frame of an electric or hydraulic table. They generally require a mounting bracket that attaches to the frame, and an extension that attaches to this mounting bracket (swing bracket), which the L-shaped arm mounts to. Generally, all of the prior art require some sort of permanent mount to the grooming table. Thus, there remains a considerable need for a rotatable grooming apparatus that temporarily connects to any style of table, is generally out of view on the underside of the table, and that is able to rotate while maintaining a constant pivot point.

FIELD OF THE INVENTION

The invention is related to animal grooming and animal grooming equipment.

SUMMARY OF THE INVENTION

Disclosed herein is a grooming arm apparatus, that temporarily clamps to an animal grooming table. The mechanical apparatus allowing for rotation of the arm around the table while maintaining a constant pivot point (the point at which the animal is connected to the grooming arm) is concealed beneath the table and therefore largely not visible during use. The arm need not permanently mount to the frame of a table unlike the prior art. The clamping mechanism allows for easy installation and removal, as well as use with any number of different table types including hydraulic, electric, non-adjustable, or mechanically adjustable dog grooming tables that do not necessarily have a frame bracket. The mechanical apparatus allowing for the rotation mounts in the clamp, and extends underneath the table to the pivot point. The extension or swing arm attaches to the pivot point and extends out past the clamping mechanism. The grooming arm then installs in the end of the extension or swing arm and rotates or swings around the end of the table.

DETAILED DESCRIPTION OF THE PREFERRED EMBODIMENTS

Disclosed herein is a grooming arm apparatus, that temporarily clamps to an animal grooming table. The mechanical apparatus allowing for rotation of the arm around the table while maintaining a constant pivot point (the point at which the animal is connected to the grooming arm) is concealed beneath the table and therefore largely not visible during use. The arm need not permanently mount to the frame of a table unlike the prior art. The clamping mechanism allows for easy installation and removal, as well as use with any number of different table types including hydraulic, electric, non-adjustable, or mechanically adjustable dog grooming tables that do not necessarily have a frame bracket. The mechanical apparatus allowing for the rotation mounts in the clamp, and extends underneath the table to the pivot point. The extension or swing arm attaches to the pivot point and extends out past the clamping mechanism. The grooming arm then installs in the end of the extension or swing arm and rotates or swings around the end of the table.

The apparatus mounts in the clamp, extends underneath the table to the pivot point where the extension is mounted and provides the rotation or swing function of the clamp, then extends out past the clamping mechanism where the grooming arm is mounted and provides the rotation or swing function of the apparatus. A two disc mechanism, utilized in most embodiments however not all embodiments, for this particular design scheme allows for the rotation and locking means and is further described herein. Of the two discs, across most embodiments, one disc is of a low friction, smooth surfaced material or of other similar qualities that allow the other disc to slide relatively easily and rotate across its surface. The disc containing notches or cut out points as described herein is stable, while the second disc in most embodiments rotates to adjust the position of the arm.

The apparatus allows the grooming arm to be rotated around the end of the table, allowing the arm to be moved out of the way of the groomer while leaving the pivot point, where the dog is connected, to remain in the same physical location. This provides a clear and major advantage over the prior art as the animal does not have to be moved, and the arm swings around to various positions without requiring disconnection and reattachment.

Further, it would conceal the mechanical apparatus underneath the table, allow the grooming arm to swing/rotate around the end of the table, and easily be removed and installed to meet the needs of the dog show exhibitor or dog groomer. It could also be installed on any grooming table including electric, hydraulic, non-adjustable, or mechanically adjustable tables.

The rotation mechanism, in one embodiment, comprises in part two discs enabling the rotation and locking mechanisms. One disc, may be a ⅛" HDPE (or other similar material providing low friction for rotation) disc that provides the rotation surface, the disc previously mentioned above. The HDPE material allows for a surface material that enables sliding or movement over the disk so the arm can move. A second disc may be a ⅛" stainless steel disc around its periphery having grooves, inlets, or notches. This second disc functions to provide the positioning of the arm, as it rotates. The two discs together allow for a rotation and locking means such that the arm may be rotated around the table and stabilized at certain positions. Those skilled in the art will recognize that the sizes and materials used may vary, and numerous alternative means may be used to enable the functions of rotation and position locking of the arm around the table.

A key feature of the current invention is the manner in which the pivot point of the device is closer to the midpoint of the table than is the attachment point of the device to the table. This, in conjunction with the attachment means which does not require a permanent attachment or connection to a table's frame, substantially differentiates the device from the prior art and provides for greatly improved functionality and ease of use.

As depicted herein the device has numerous mechanical features to enable the desired functions. The features may be categorized into basic functions that will be recognized by those skilled in the art, and may be carried out through alternative means. Such groups may include a temporary attachment to the table (table mount, or clamp, etc.), a means of rotating the arm around the table (rotation device, swing apparatus, etc.), and the arm or extension that an animal is secured to. Further functional areas include stabilizing structures or parts located on or near the rotation device to stabilize the device on the underside of the table, separate from the clamping portion. Of particular importance is the relationship between the rotation means and the clamp or means of securing to the table. As stated elsewhere the rotation means and pivot point are central or towards the center of the table in comparison to the clamping or attachment means of the device which is located at the edge of the table.

The device has 3 basic functional areas, made up of various components described herein. Functional Area 1 may be described herein as the grooming arm or swing arm. Functional Area 2 may be described as the rotation piece, disc, locking wheel, or rotation means. Functional Area 3 may be described herein as the table connection, clamp, or attachment piece.

Figure 1A:
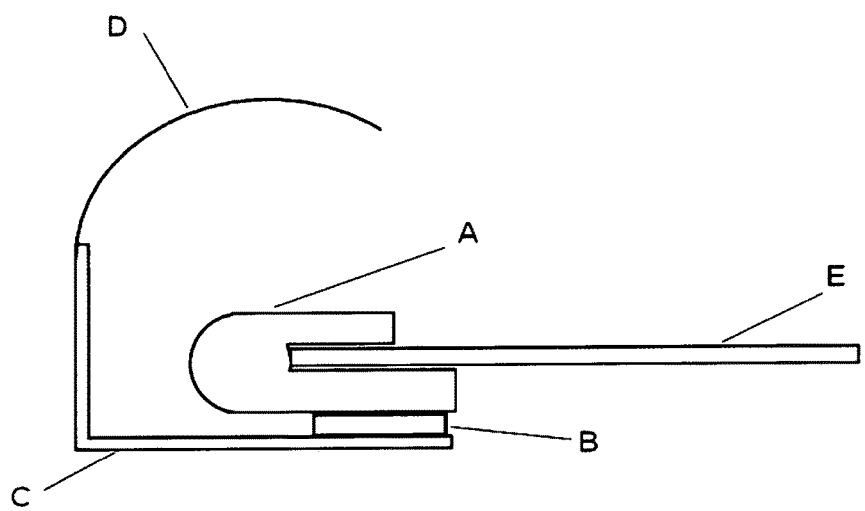

Key features of the components shown in FIG. 1A include that Element A connects to the table's edge and the rotation means, and contacts the table in a way that allows for support of the rotation means and the swing arm (Element C). The structure of Element A is such that force applied to from the weight and or use of B and C is distributed along the contact points that A makes with the table E, which accounts for the strength and stability of the device. FIG. 1A depicts the most basic embodiment of the current invention broken down into four functional components or means. In FIG. 1A, Element E refers to a table such as a dog grooming table. Element A refers to Functional Area 3, a table connection piece or clamping means. Element B refers to a rotation means or Functional Area 2. The rotation means connects to A and C, and allows for the movement of C. Element C is Functional Area 1 or the swing arm or grooming arm. Element D is the portion of Element C that attaches and secures an animal on the area of the table's surface.

Figure 1B:
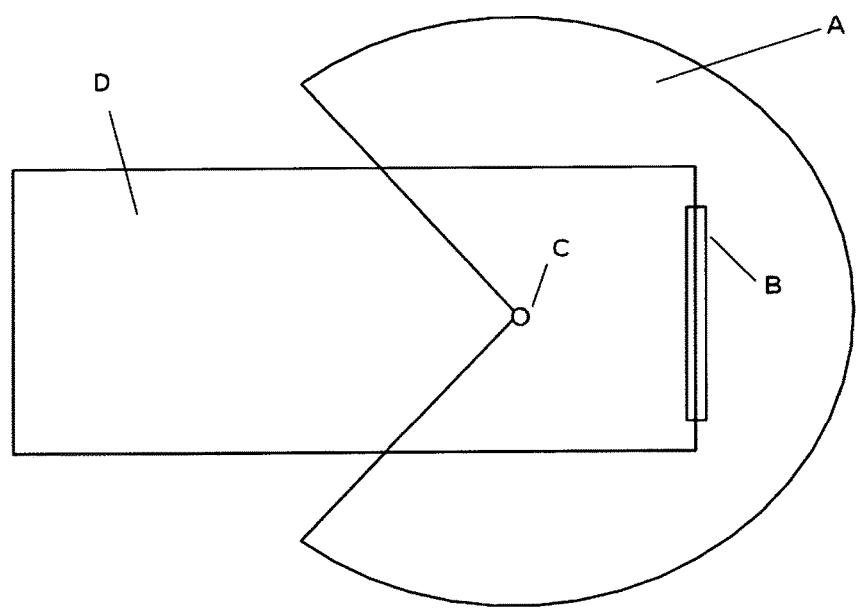

FIG. 1B depicts an approximate range of motion (A) for the grooming arm around a table (D) and the device's pivot point (C), with the device secured to the edge of the table in area B.

Figure 1C:
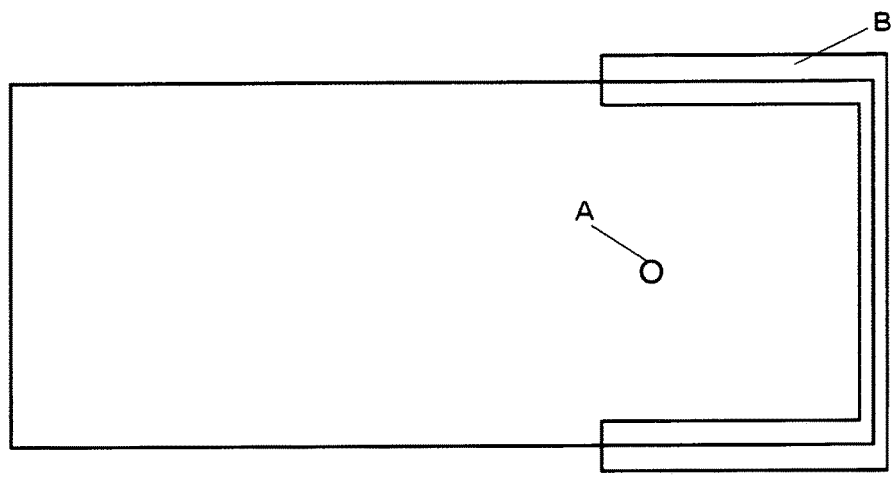
Figure 2A:
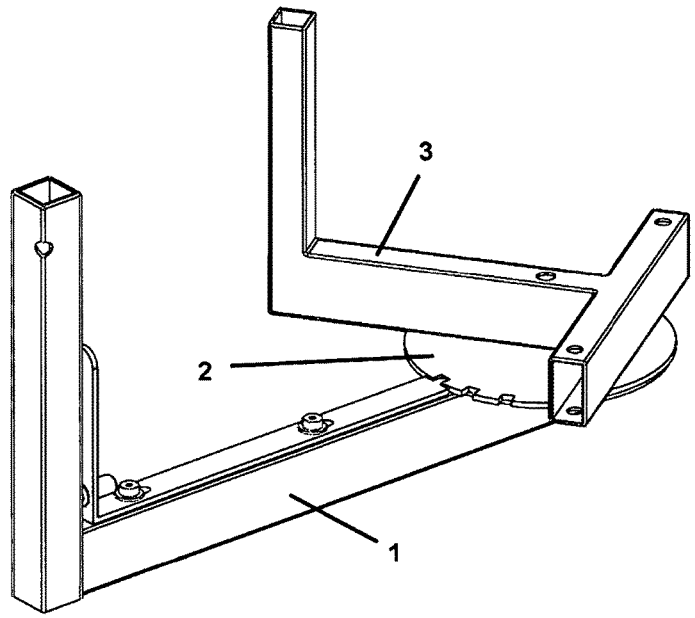
FIGS. 2A-2F show a more detailed depiction of one embodiment of the concepts depicted in FIG. 1A.
Figure 2B:
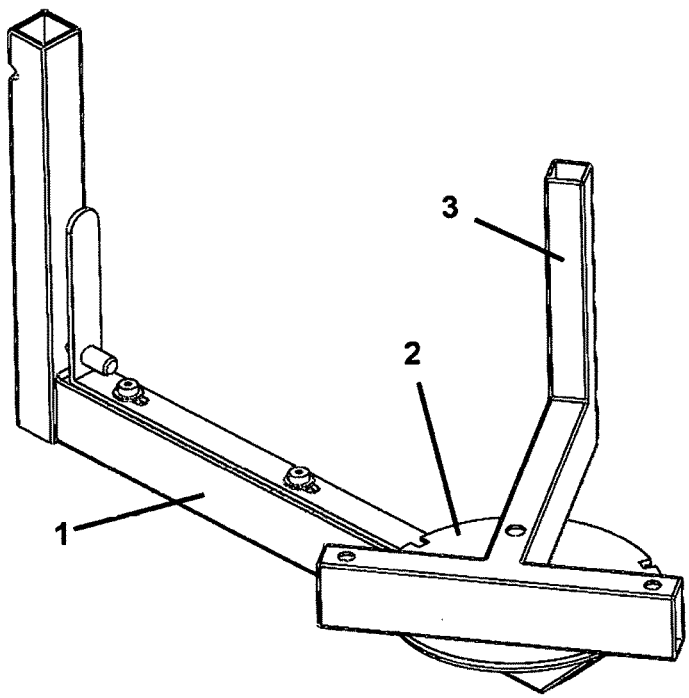
Figure 2C:
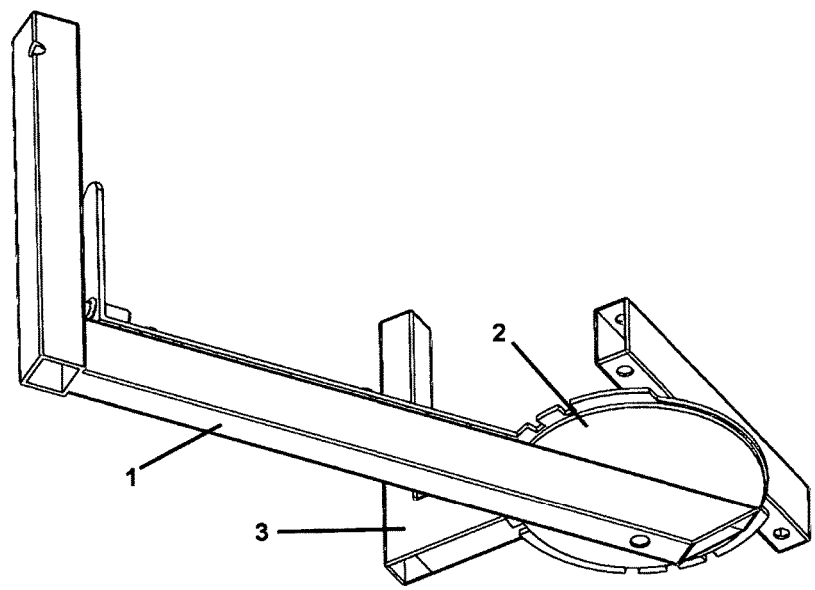
Figure 2D:
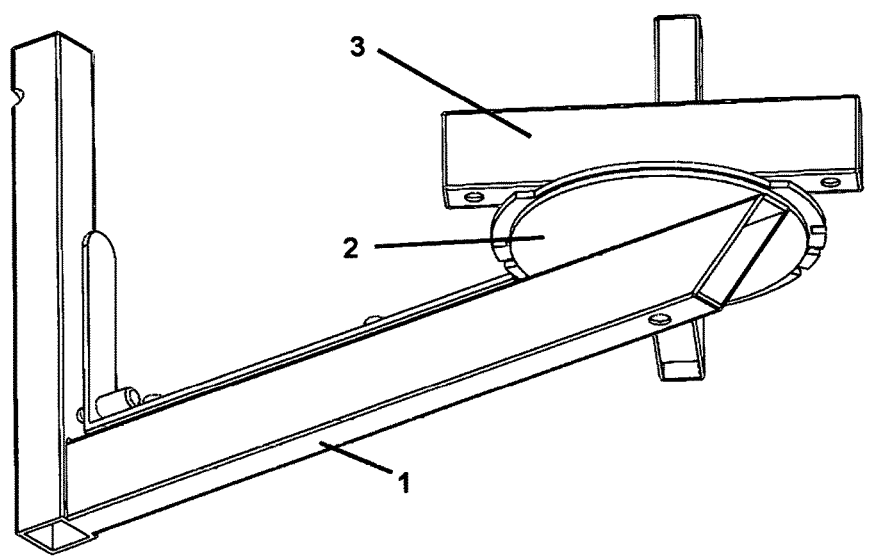
Figure 2E:
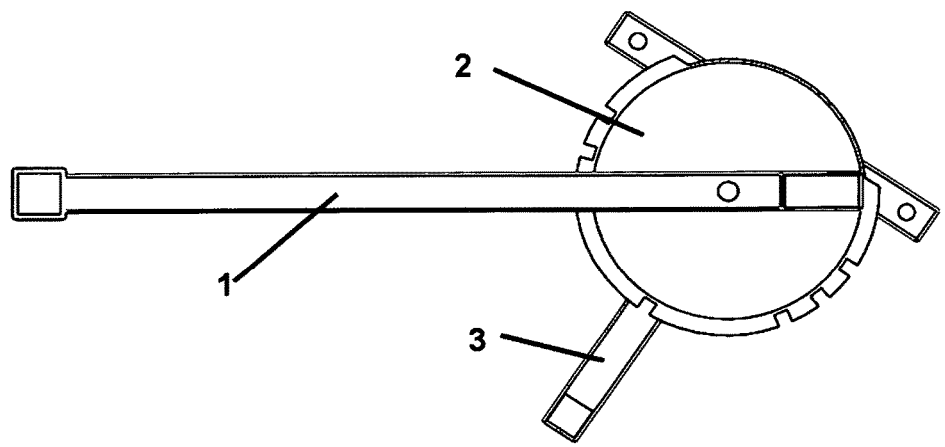
Figure 2F:
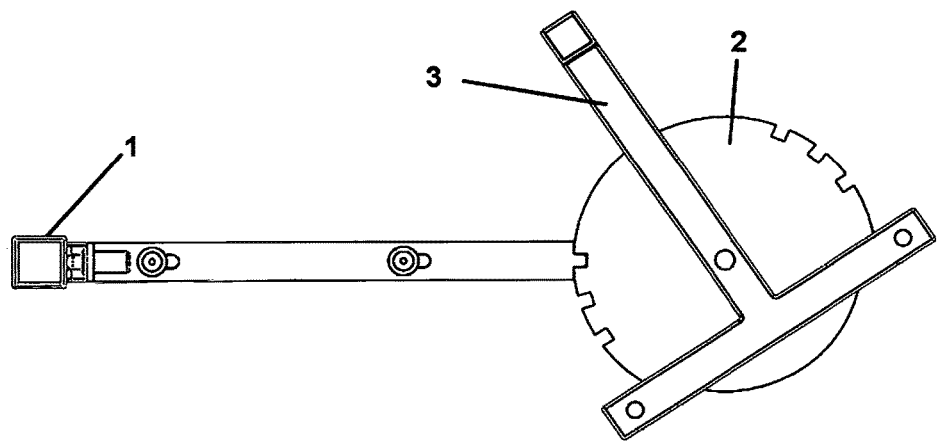
Figure 3A:
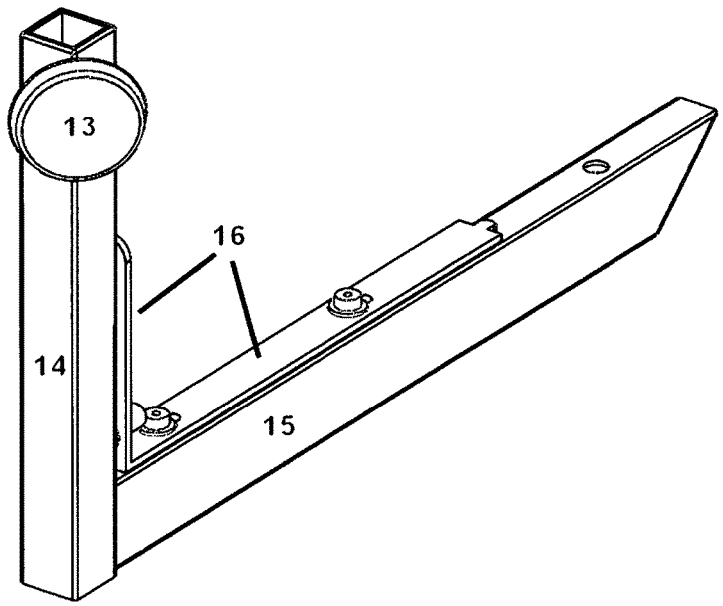
FIGS. 3A-3I show various views of swing arm assembly. It is shown from top, bottom, front, back and side perspective views.
Figure 3B:
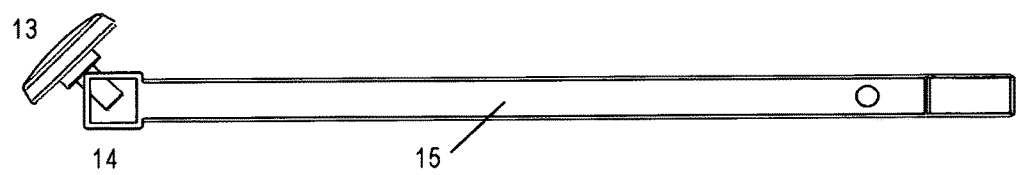
Figure 3C:
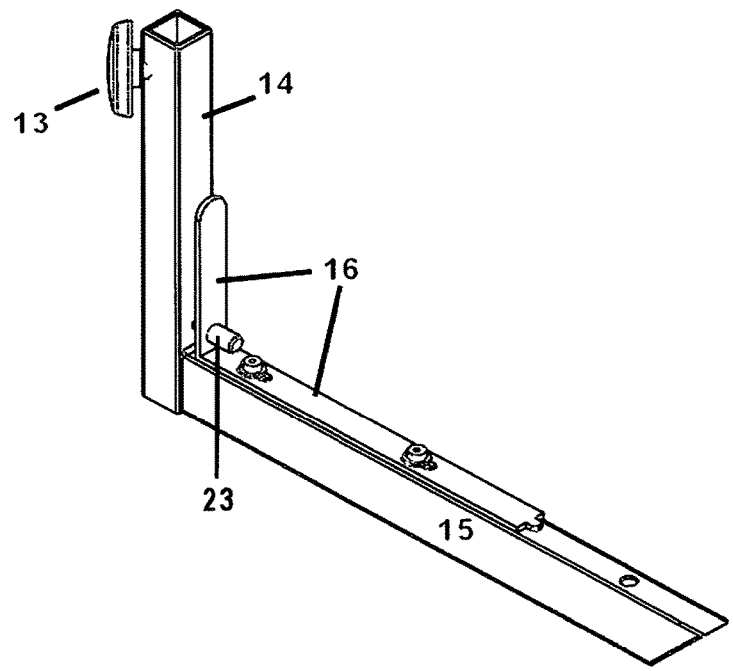
Figure 3D:
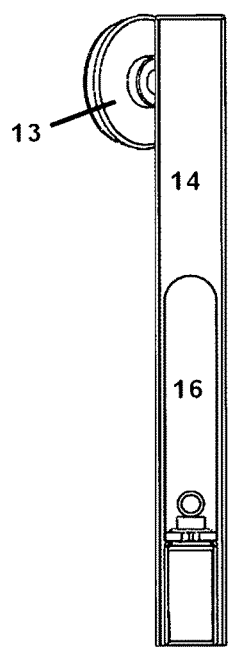
Figure 3E:
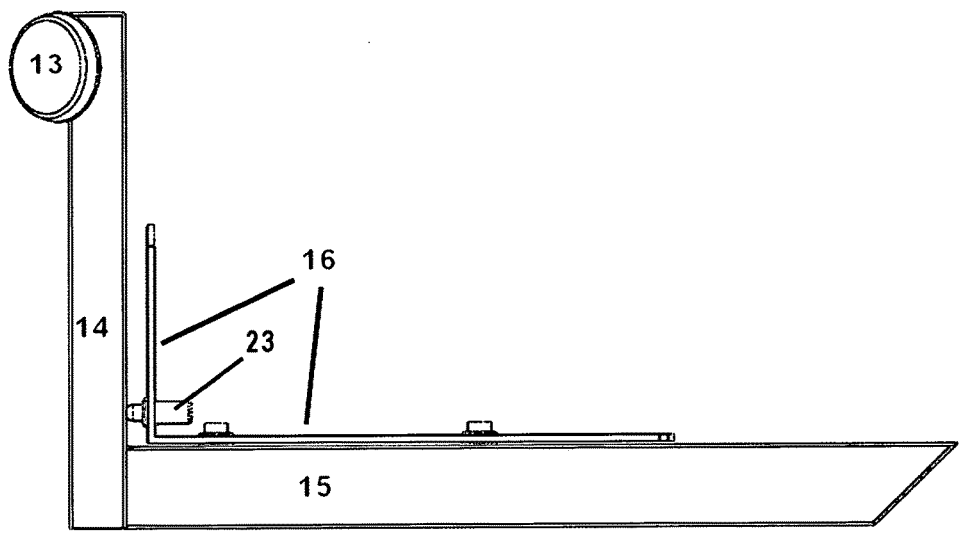
Figure 3F:
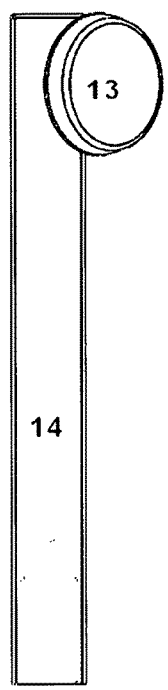
Figure 3G:
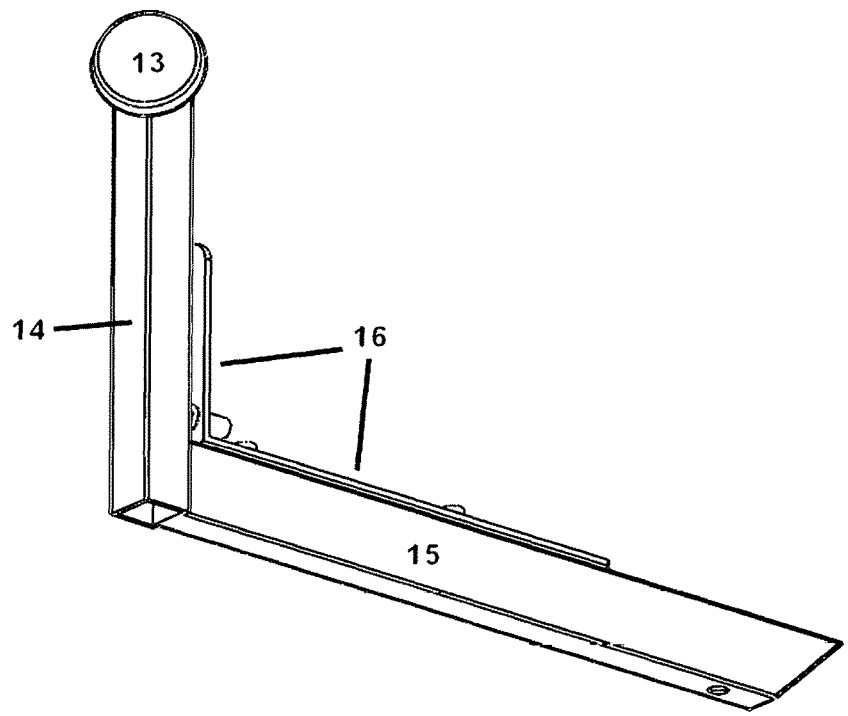
Figure 3H:
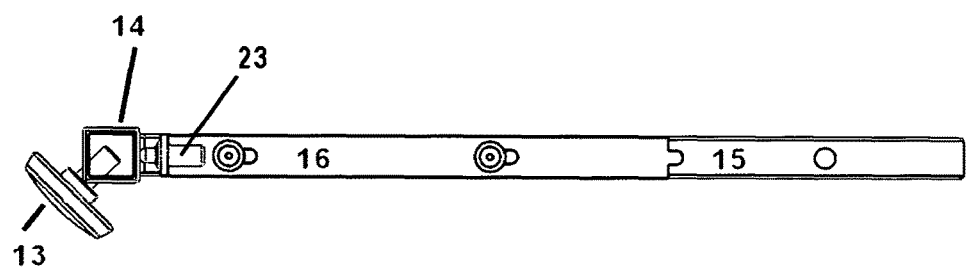
Figure 3I:
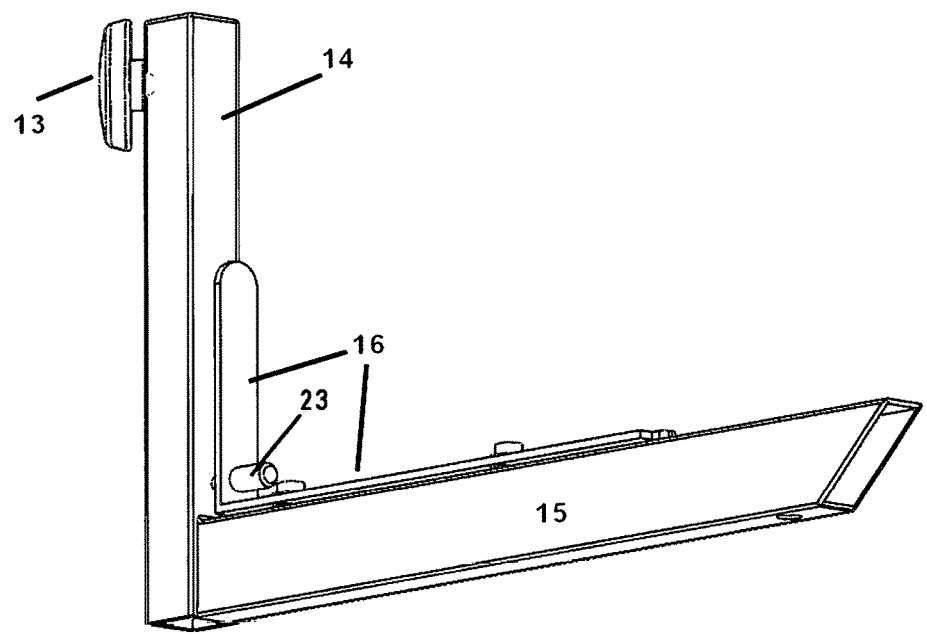

FIG. 1C shows a general range of attachment areas (B) for the device in relation to the table's edge and the central pivot point (A) of the device.

FIGS. 2A-2F show a more detailed depiction of one embodiment of the concepts depicted in FIG. 1. The figures display Functional Areas 1, 2 and 3 in general. In FIGS. 2A-2F, number 1 refers to Functional Area 1, number 2 refers to Functional Area 2, and number 3 refers to Functional Area 3.

FIGS. 2A-2F, are meant to show the basic arrangement and nature of the functional areas and how they relate to each other. Further details for each functional area and its components are described elsewhere herein, as are the various embodiments of the system as a whole.

Functional Area 1—Grooming Arm. Functional Area 1, comprised of the grooming arm, or swing arm component, attaches to the rotation means on the underside of a grooming table. The arm extends outward from underneath the table. Once clear of the edge of the table the arm turns upward at a ninety degree angle, in the preferred embodiment.

In FIGS. 3A through 3I, Element 13 is an Adjustment Knob. The knob may be attached to the Vertically Extending Support Arm (Element 14) through a hole threaded into one corner of the Vertically Extending Support Arm. The purpose is to be tightened or released to allow the Grooming Arm portion of the device (FIGS. 6A-6I, Element 18) to adjust up or down depending upon the size of the animal being groomed.

Element 14 is the Vertically Extending Support Arm of the Swing Arm Assembly. Its purpose is to function as a receiver to accept and hold the actual Grooming Arm portion of the device (Element 18). Element 15 is the Lateral Extension Support Bar that connects underneath the rotation means.

Element 16 refers to a Locking Lever. The L-shaped Element is attached to Element 15, the Lateral Extension Support Bar that connects underneath the rotation means. The purpose is to lock or unlock the Swing Arm Assembly to allow for rotation and locking means. The feature may have a D-shaped extrusion on the longer horizontal leg that intercepts the grooves, inlets, or notches on the metal disk to provide the locking function. The longer horizontal leg of the Locking Lever may be mounted to Element 15 via two shoulder bolts and spring washers. A spring plunger, Element 23, which is mounted on the shorter vertical leg of the Locking Lever, is utilized to provide spring tension to hold the D-shaped prong in the locking grooves, inlets, or notches of the metal disk, Element 10, to provide the locking function. The Locking Lever functions by squeezing the shorter vertical leg against Element 14 to release the D-shaped extrusion from the grooves, inlets, or notches on the metal disk to allow the Swing Arm Assembly to rotate.

Functional Area 2—Rotation. Functional Area 2 provides for the ability of the Swing Arm to move around the table. In the preferred embodiment, a two disc mechanism, utilized in most embodiments however does not all embodiments to this particular designs scheme, allows for the rotation and locking means and is further described herein. Of the two discs, across most embodiments, one disc is of a low friction, smooth, or of other similar qualities that allow the swing arm component to relatively easily slide and rotate across its surface. The disc containing notches or cut out points as described herein is attached to the Clamp Bracket. FIG. 9A, and does not move.

The rotation mechanism, in one embodiment, comprises in part two discs enabling the rotation and locking mechanisms. One disc, may be a ⅛" HDPE (or other similar material providing low friction for rotation) disc that provides the rotation surface, the disc previously mentioned above. The HDPE material allows for a surface material that enables sliding or movement over the disk so the arm can move. A second disc may be a ⅛" stainless steel disc around its periphery having grooves, inlets, or notches. This second disc functions to provide the positioning of the arm, as it rotates. The two discs together allow for a rotation and locking means such that the arm may be rotated around the table and stabilized at certain positions. Those skilled in the art will recognize that the sizes and materials used may vary, and numerous alternative means may be used to enable the functions of rotation and position locking of the arm around the table.

Figure 4A:
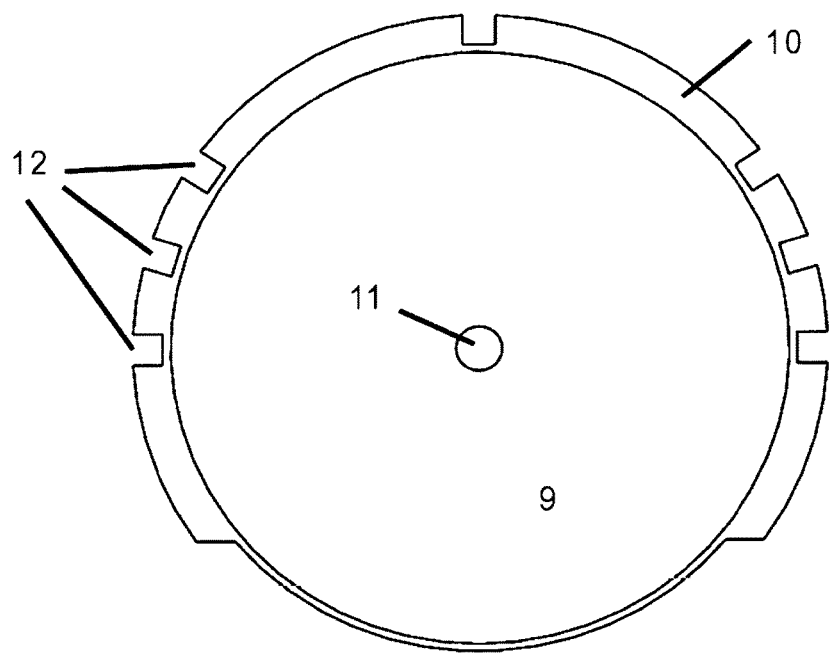
Figure 4B:
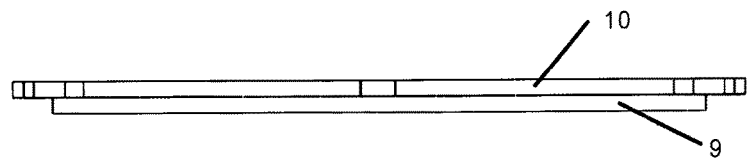
Figure 4C:
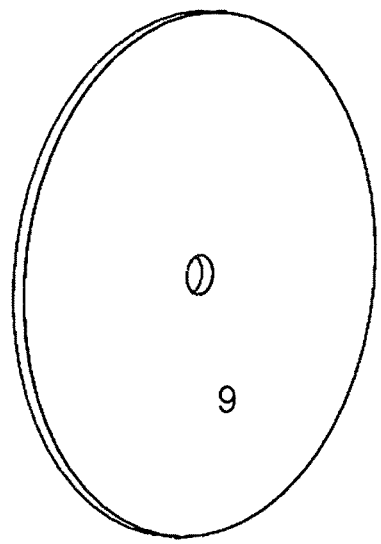
Figure 4D:
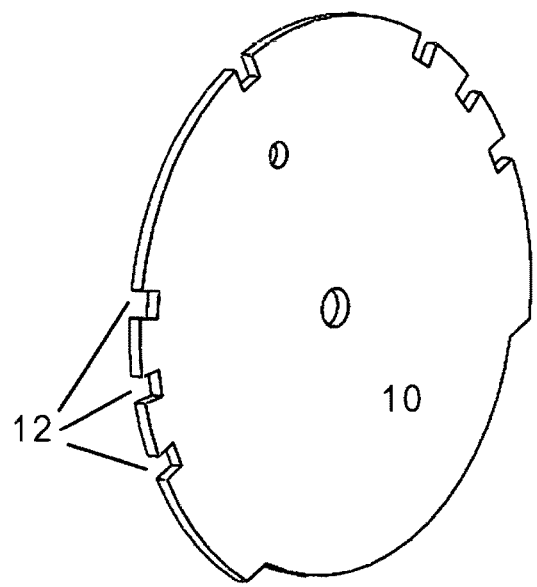

In FIGS. 4A-4D, Element 9 refers to the lower disc in the rotation means and assembly. Element 10 refers to the upper disk of the rotation means and assembly. Element 11 is a central connection piece holding Elements 9 and 10 together or within a certain proximity of each other, as well as providing potential connections to the rest of the apparatus. Element 12 indicates the locking grooves of the upper piece, Element 10, that allow the rotation means to be locked into certain positions. FIG. 4A shows an underside view of the two discs assembled. FIG. 4B shows a side view of the same discs. FIG. 4C is an isolated view of the lower disc, and 4D is an isolated view of the upper disc.

Functional Area 3—Attachment. Functional Area 3 enables the device to be secured to a table, and does so in such a manner as to provide for the unique advantages over the prior art. In most embodiments the table attachment works by connecting some type of extension, bar, or elongation to the rotation means. The extension or bar has at one end one or more supports extending upward and contacting the underside of the table. At the other end of the extension or bar is a means of securing the extension to the outer edge of the table, such as a clamp mechanism as in the preferred embodiment.

In FIGS. 5A-5I, the attachment piece is shown in detail for one particular embodiment. Element 1 indicates the upper lateral running extension that extends over the upper surface of a table. Element 2 indicates a vertical running support piece or beam that connects with Elements 1 and 3, and may in certain embodiments contact the outside edge of a table. Element 3 indicates the lower or underside lateral extension that supports the apparatus from the underneath the table. Elements 5, 4, 8, and 7 indicate a vertical support (Elements 5 and 8) and platform (Elements 4 and 7) that connect to Element 3 and provide underside support and come into contact with the lower surface area of the table.

Figure 5A:
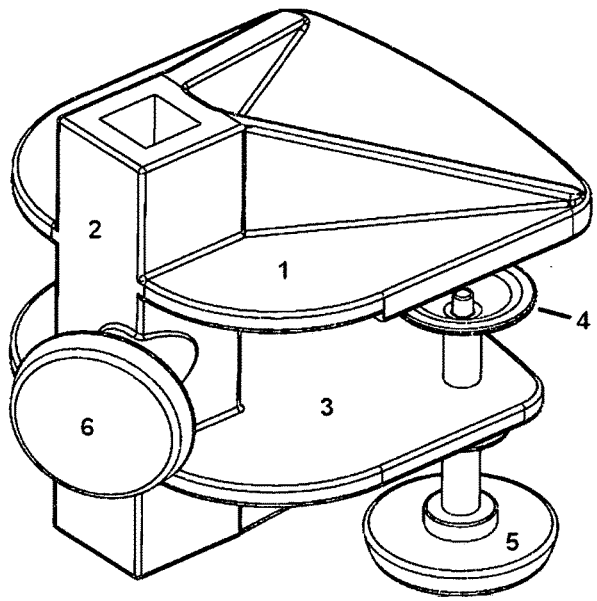
Figure 5B:
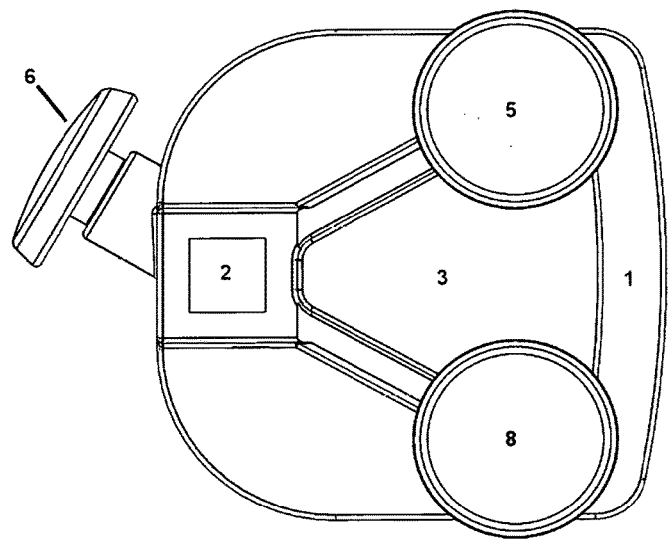
Figure 5C:
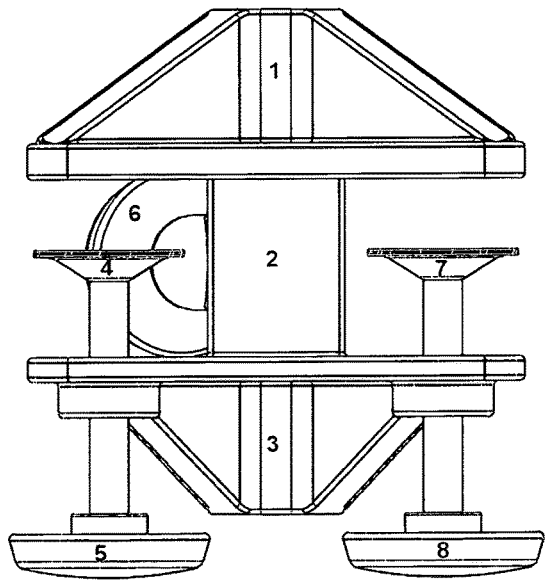
Figure 5D:
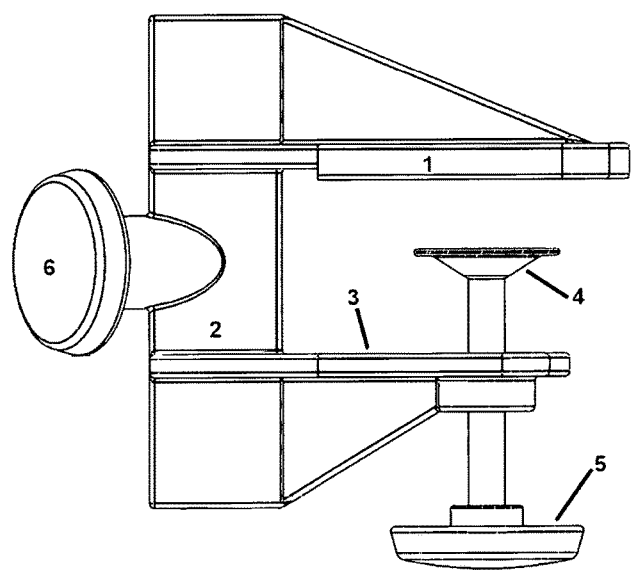
Figure 5E:
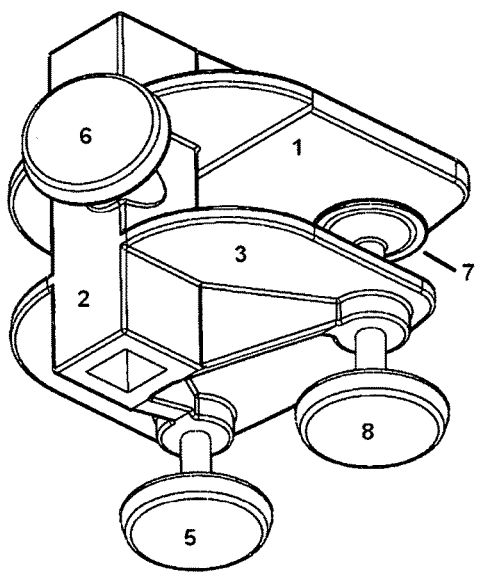
Figure 5F:
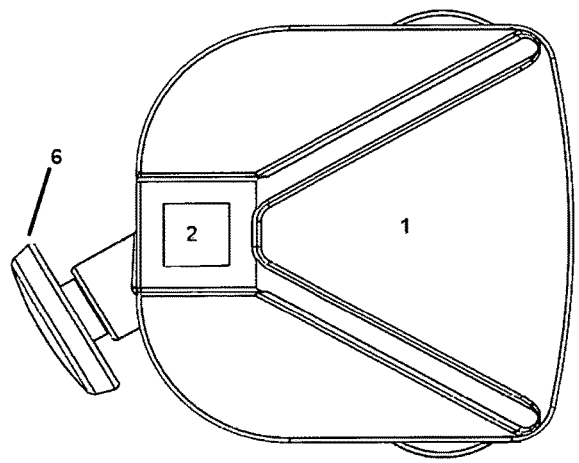
Figure 5G:
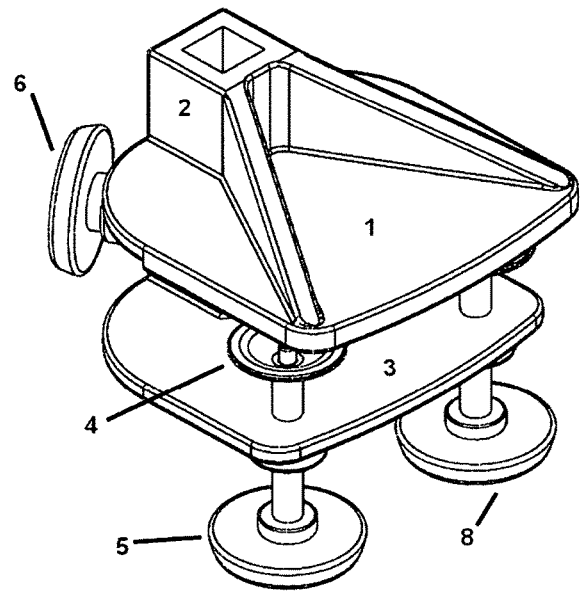
Figure 5H:
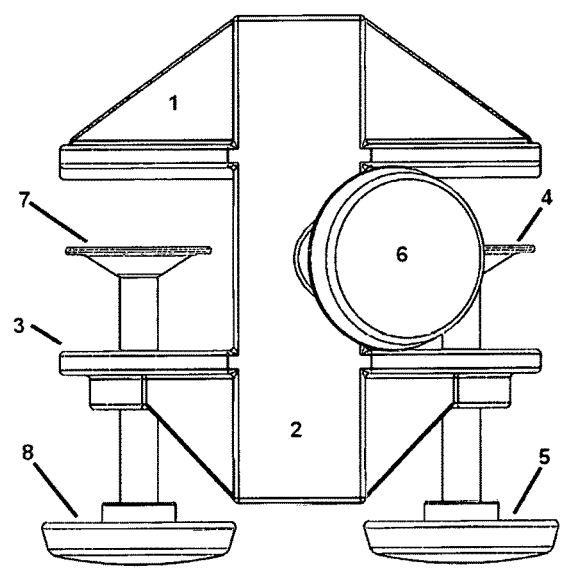
Figure 5I:
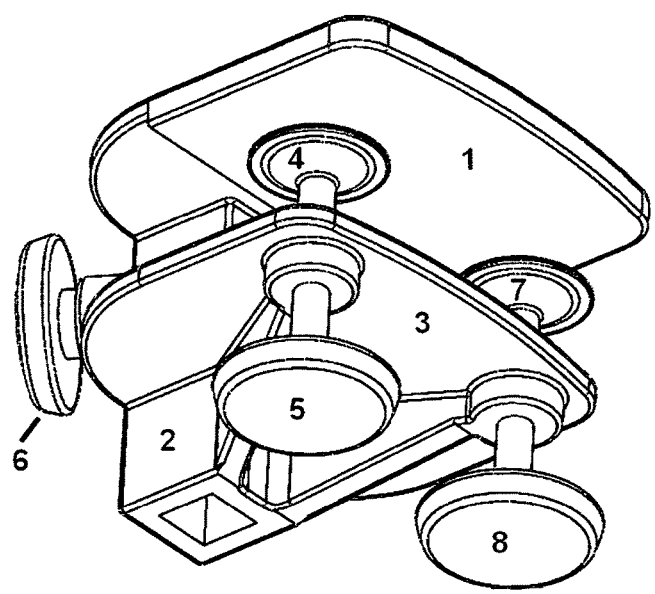
Figure 6A:
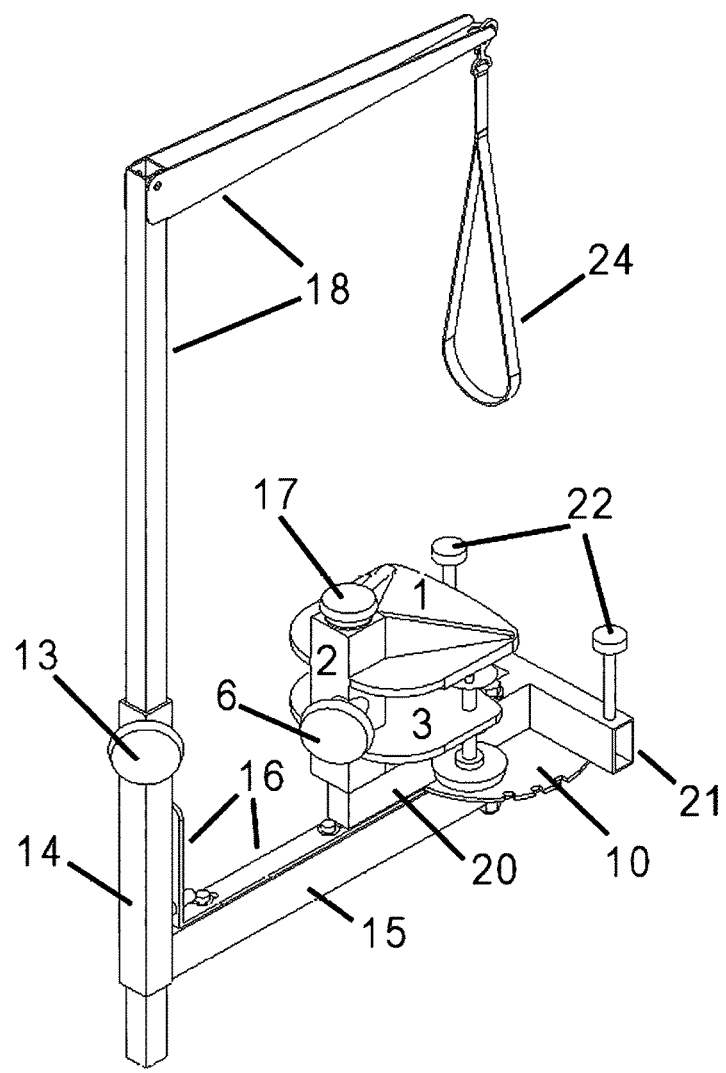
Figure 6B:
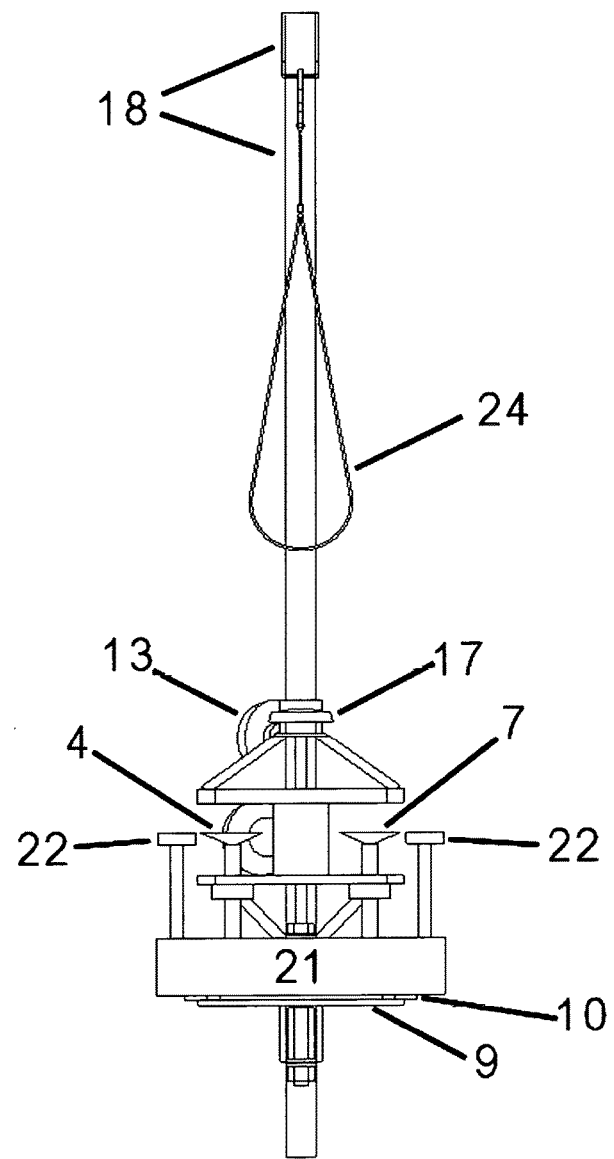
Figure 6C:
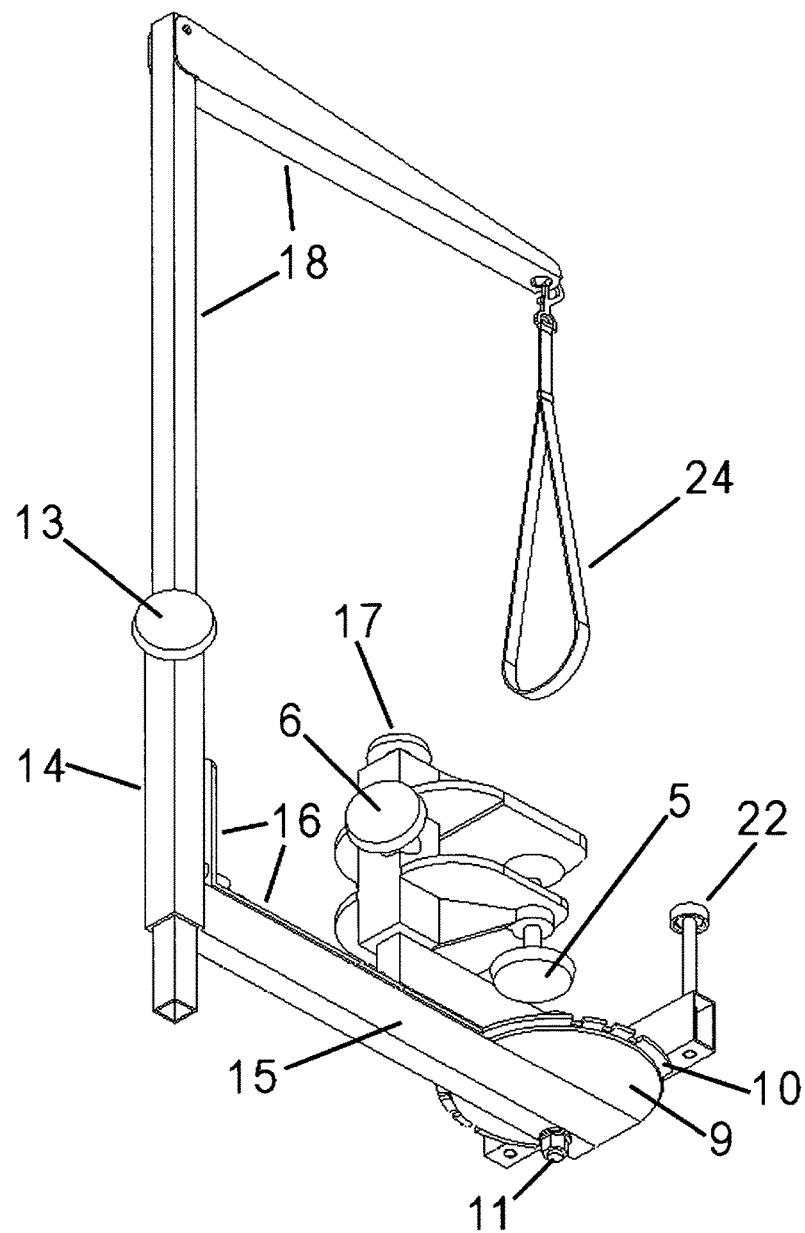
Figure 6D:
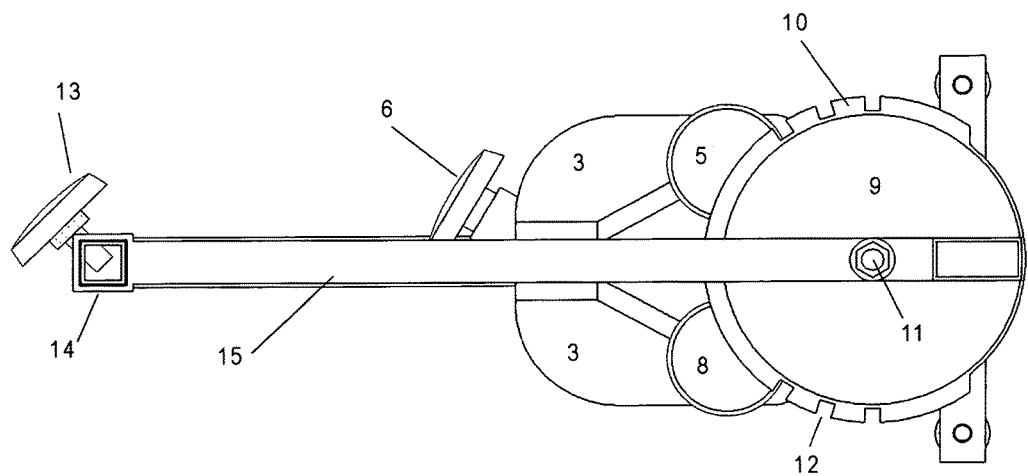
Figure 6E:
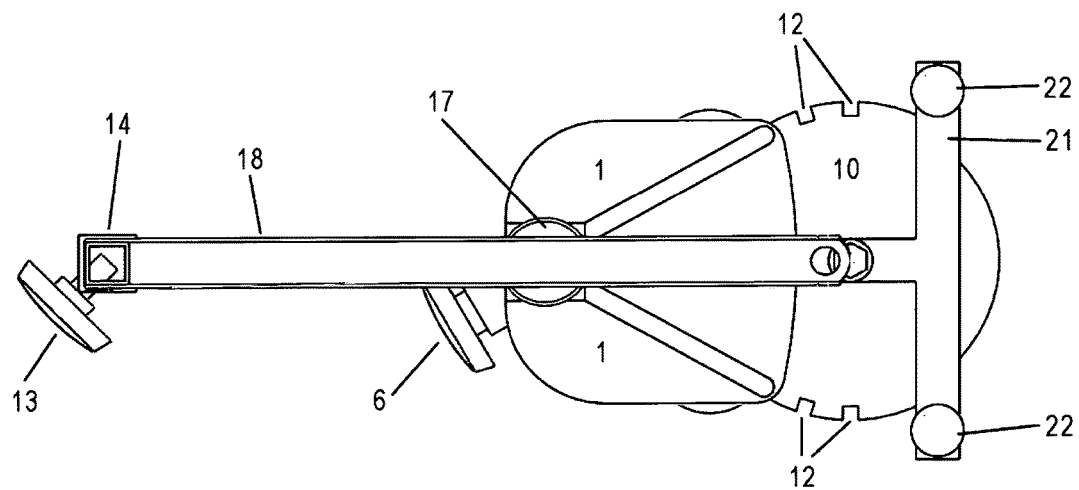
Figure 6F:
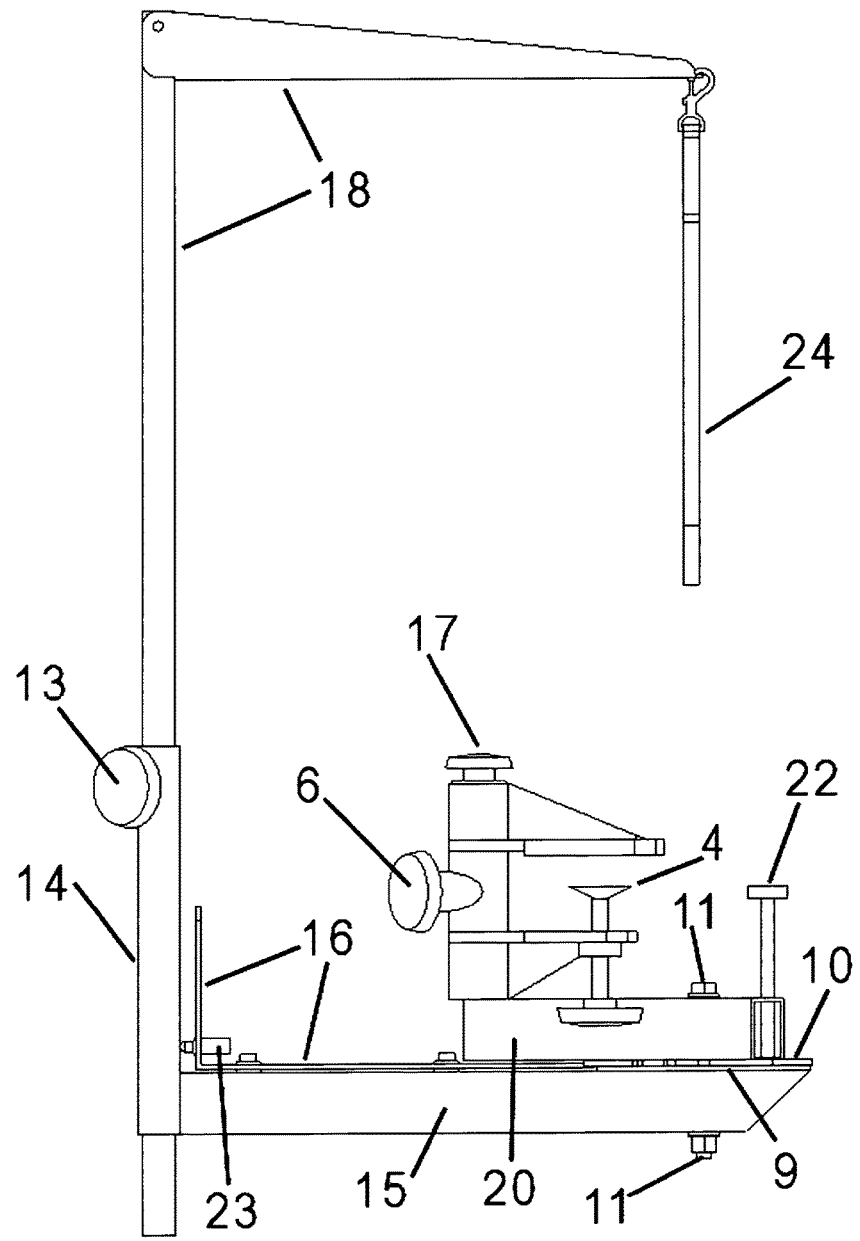
Figure 6G:
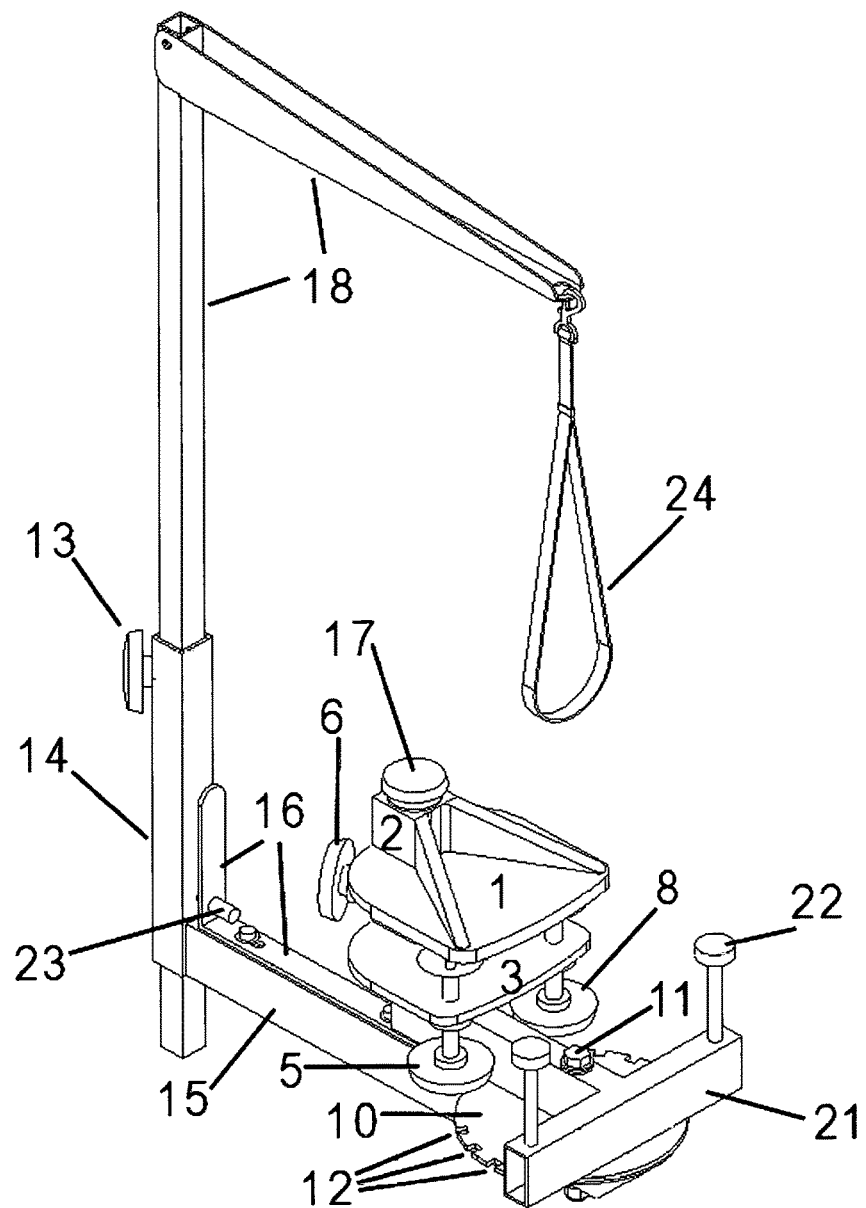
Figure 6H:
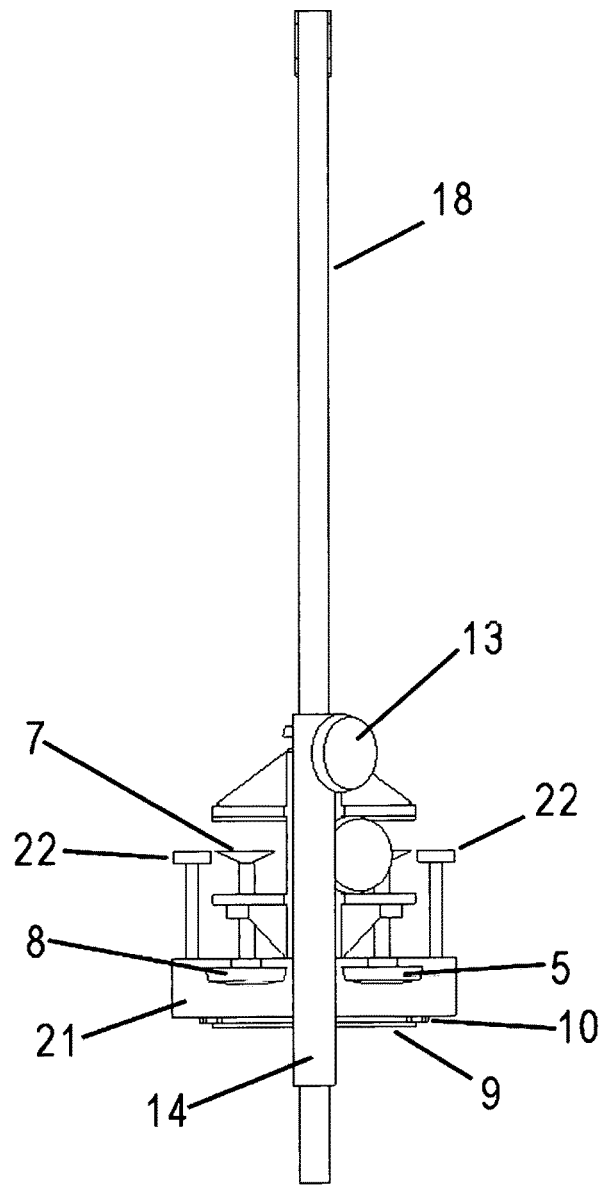
Figure 6I:
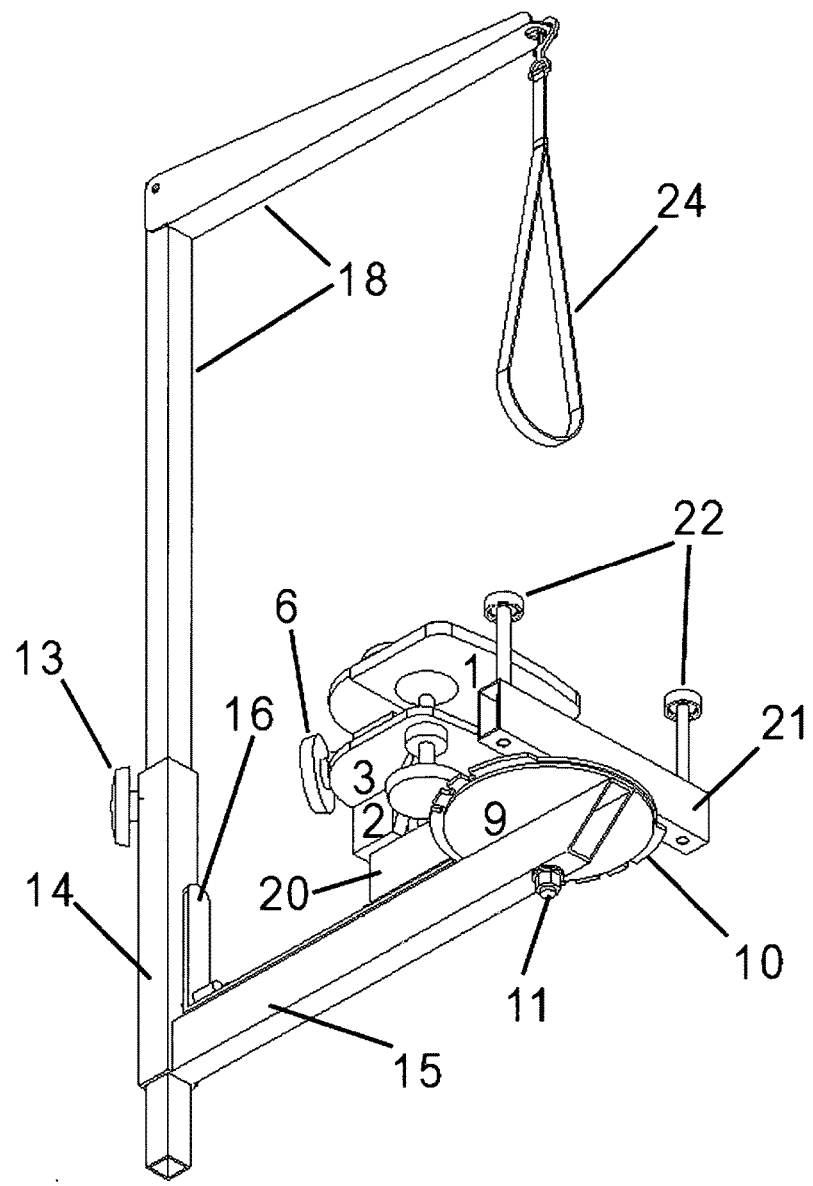
Figure 7A:
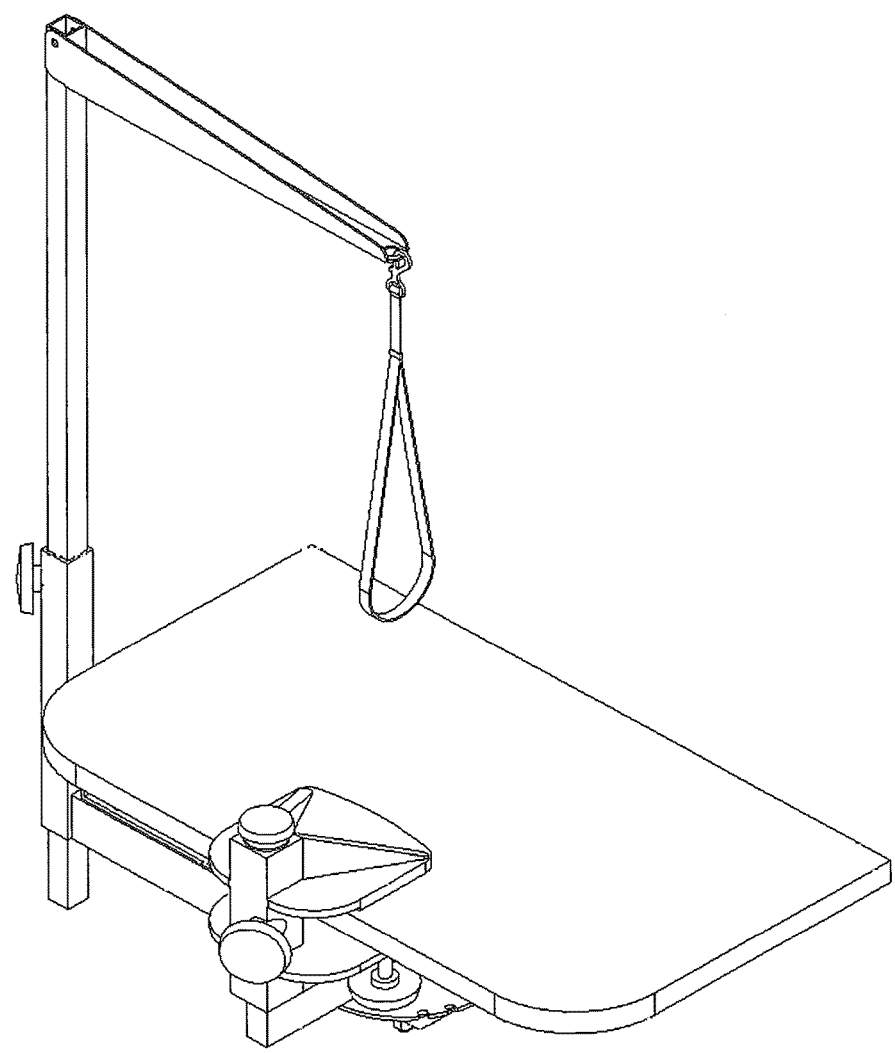
Figure 7B:
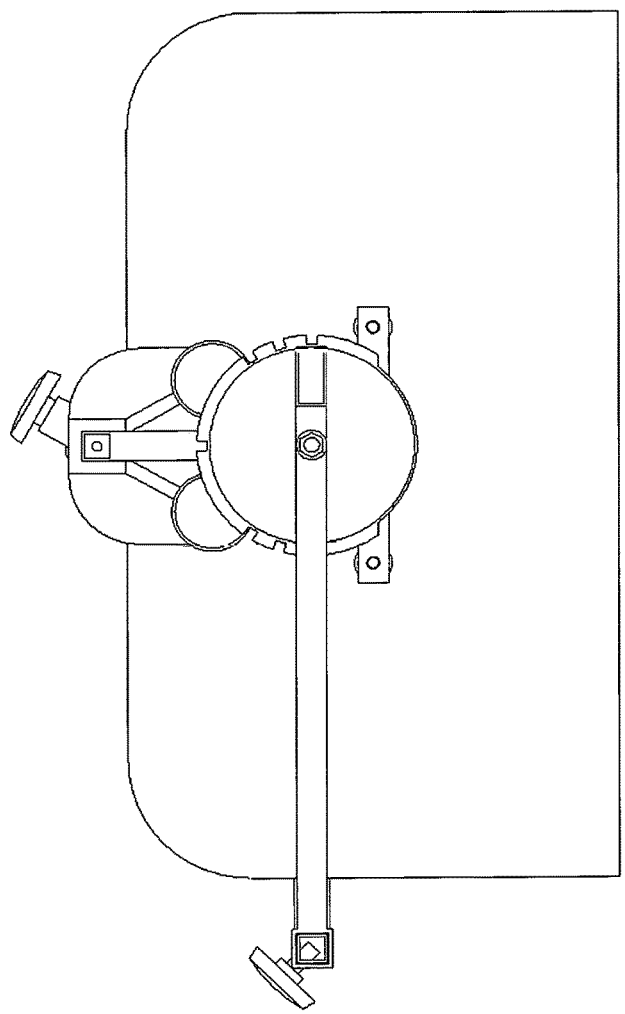
Figure 7C:
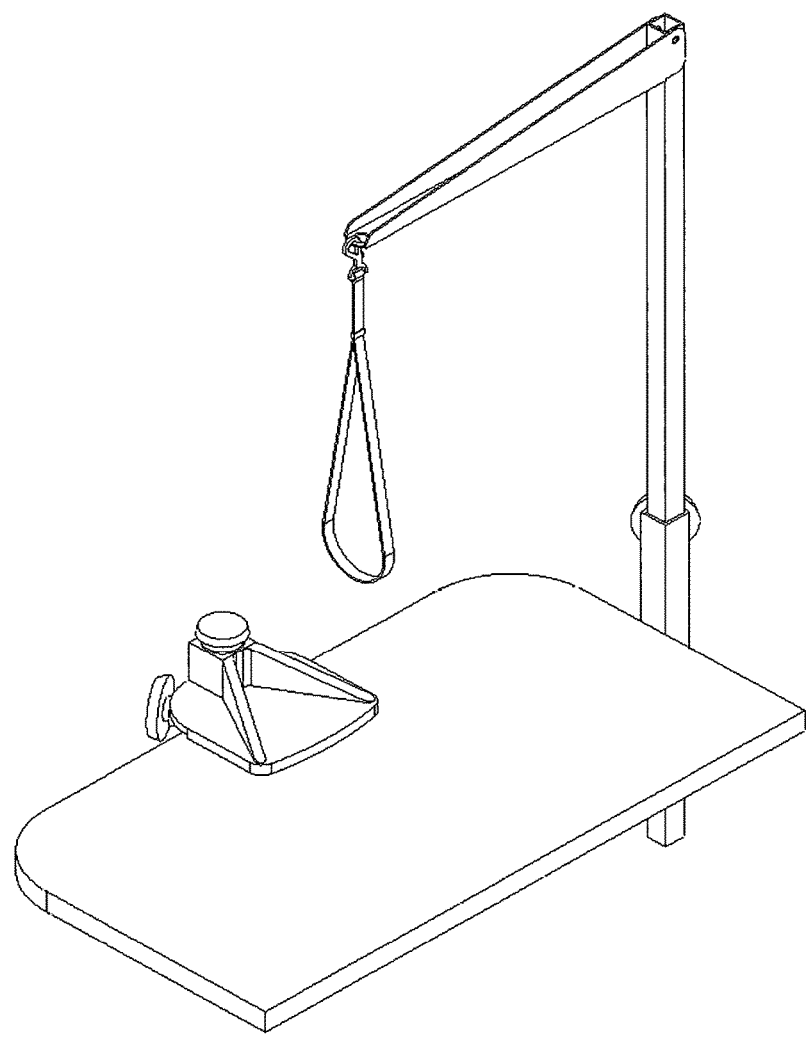
Figure 7D:
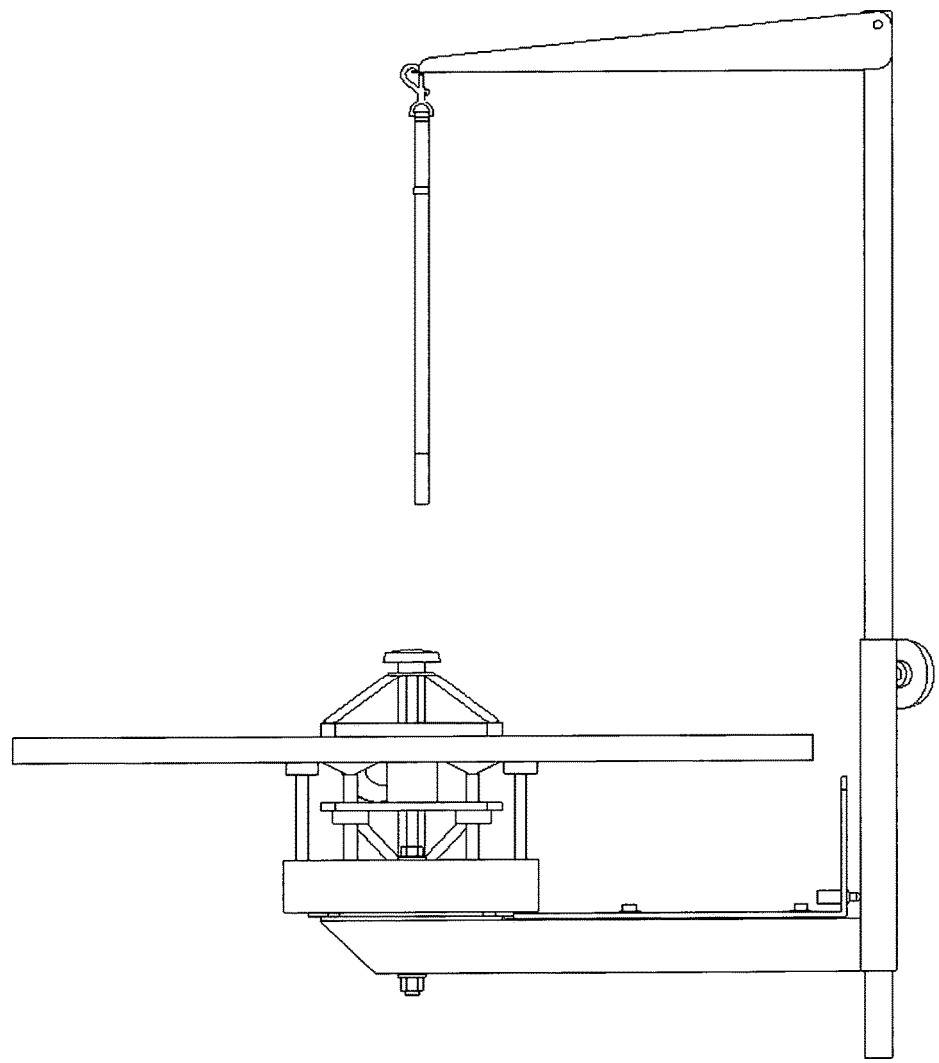
Figure 7E:
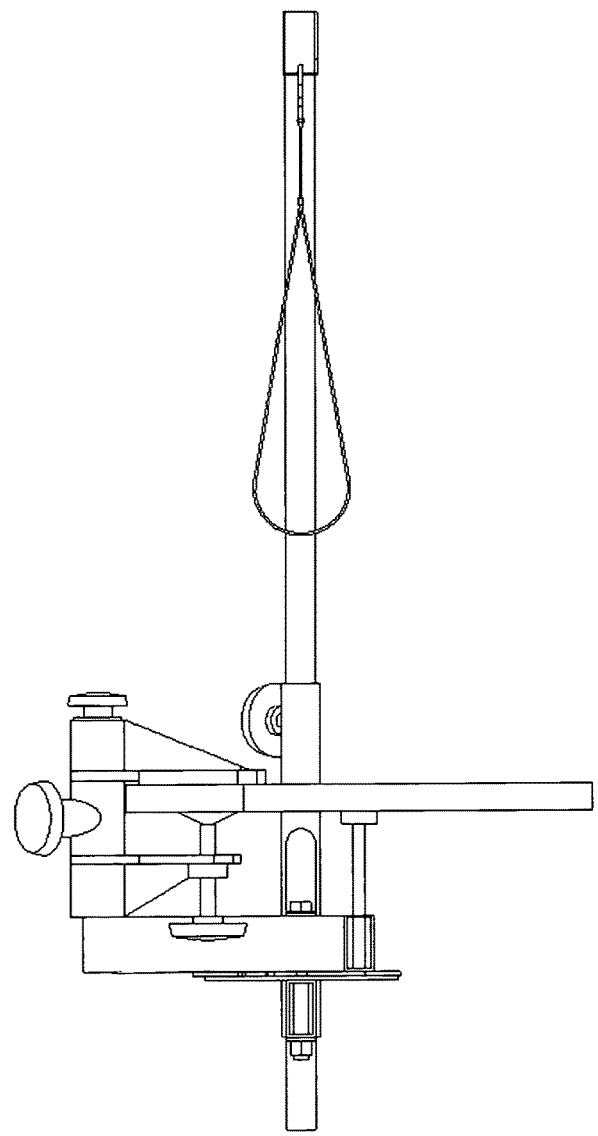
Figure 7F:
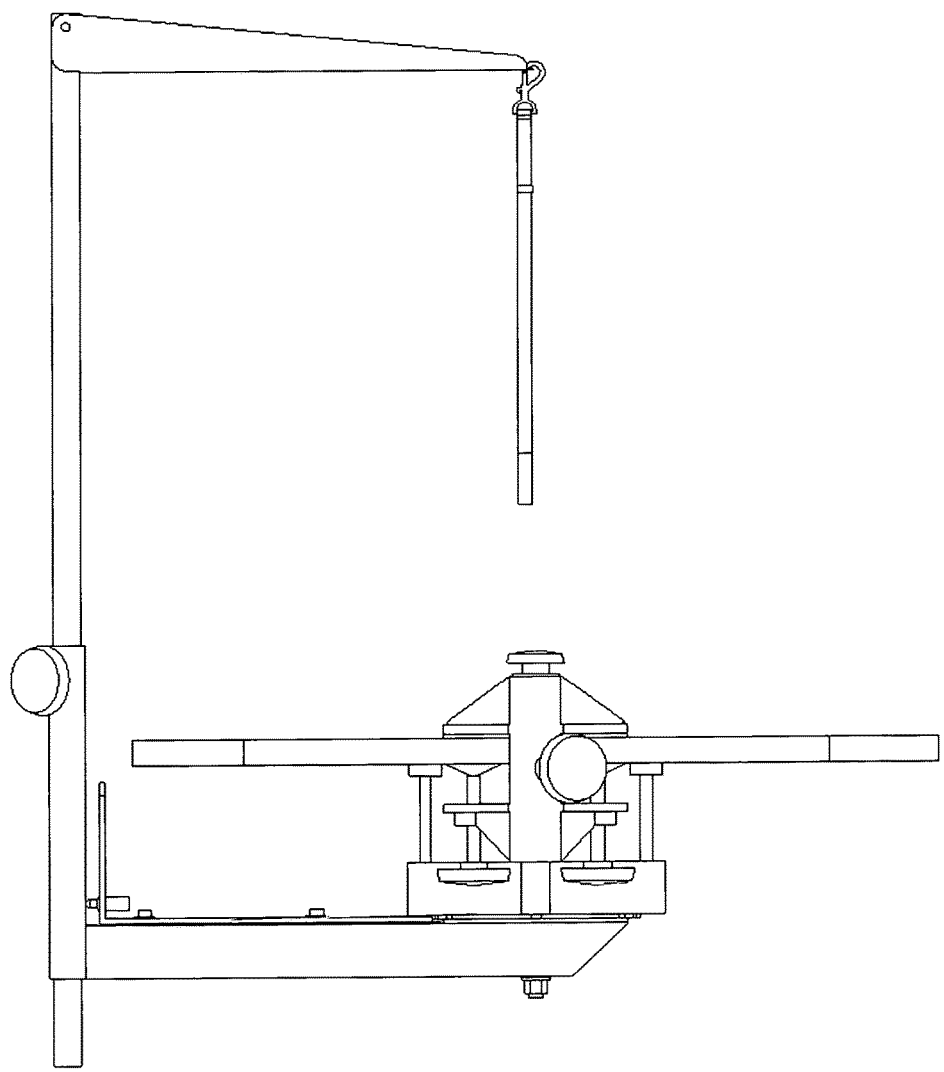
Figure 7G:
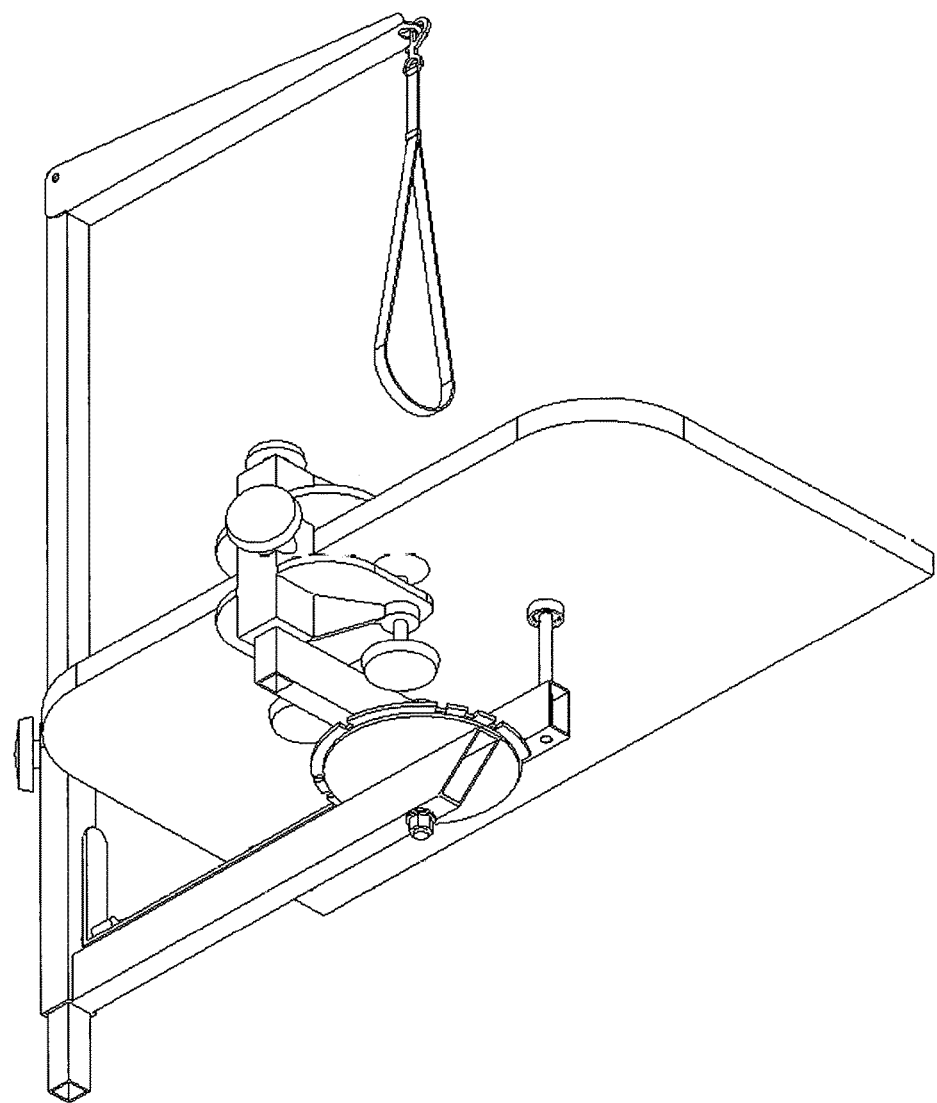
Figure 7H:
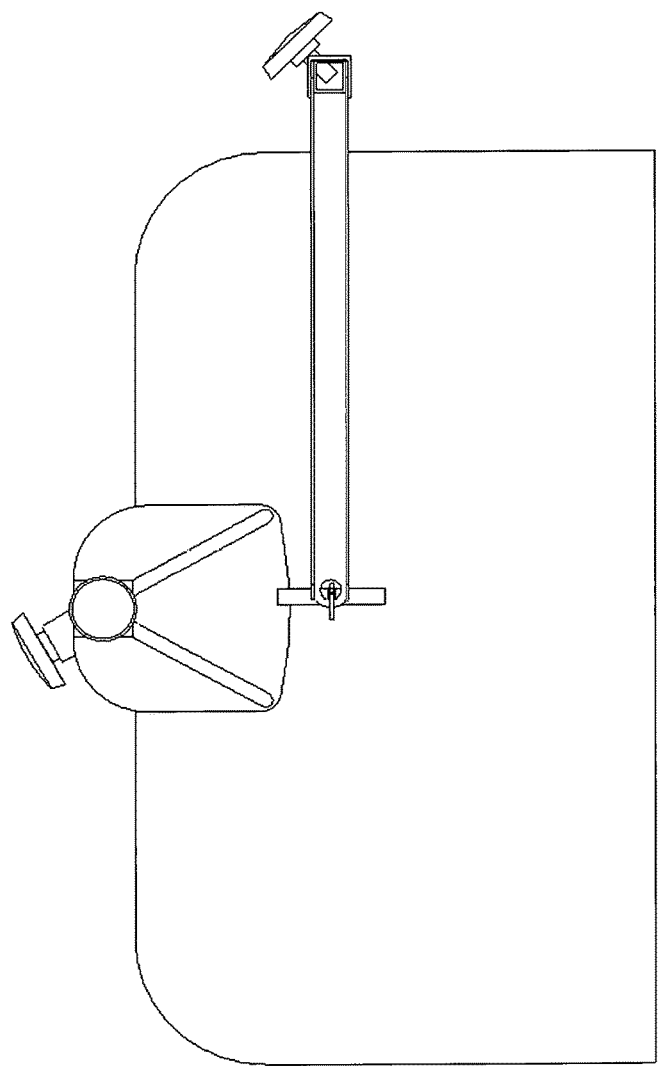
Figure 7I:
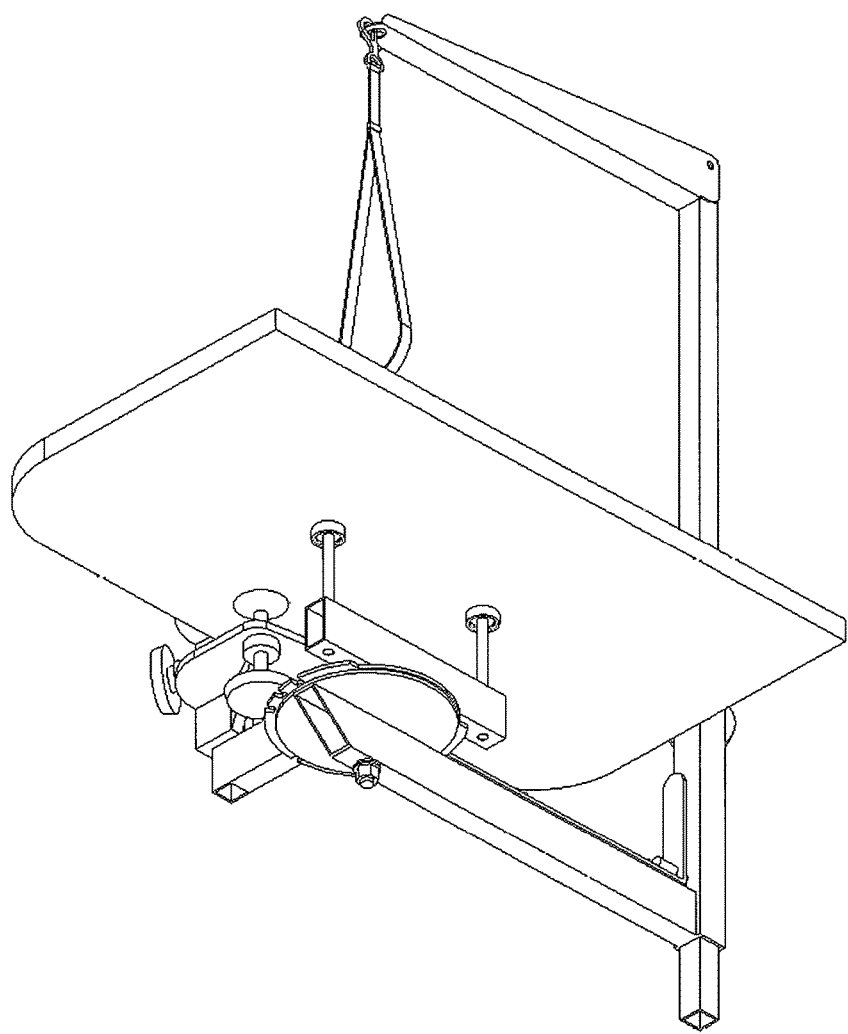

FIGS. 9A and 9B depict the Clamp Bracket. Element 19 is a vertical arm that mounts in the table attachment piece (FIGS. 5A-5I) and is held in place by the clamp knob, Element 6. The purpose of Element 19 is to provide a means of attaching the Swing Arm Apparatus to the table attachment piece (FIGS. 5A-5I). Element 20 is the lateral support bar that connects to Element 19, and includes a hole that defines the pivot point on the apparatus. Element 21 is perpendicularly attached to Element 20 in a "T" arrangement. Element 22 refers to the two bolts that are mounted in the "T" legs of the Element 21. The purpose of these two bolts is to provide strength and stability to the Swing Arm Apparatus once it is mounted to the table. FIG. 9B shows the Clamp Bracket assembled to the table attachment piece (FIGS. 5A-5B).

FIGS. 6A-6I show one embodiment of the entire system assembled. Describing the figure in detail, Element 1 indicates the upper lateral running extension that extends over the upper surface of a table. Element 2 indicates a vertical running support piece or beam that connects with Elements 1 and 3, and may in certain embodiments contact the outside edge of a table. Element 3 indicates the lower or underside lateral extension that supports the apparatus from underneath the table. Elements 5 and 8 indicate a vertical support that connects to Element 3 and provides underside support. Elements 4 and 7 are platforms that attach to Elements 5 and 8 and contact the lower surface area of the table. Element 9 refers to the lower disc in the rotation means and assembly. Element 10 refers to the upper disk of the rotation means and assembly. Element 11 is a central connection piece holding Elements 9 and 10 together or within a certain proximity of each other, as well as providing potential connections to the rest of the apparatus. Element 12 indicates the locking grooves of the upper piece clement 10 that allow the rotation means to be locked into certain positions.

Element 13 is an Adjustment Knob. The knob may be attached to the Vertically Extending Support Arm (Element 14) through a hole threaded into one corner of the Vertically Extending Support Arm. The purpose is to be tightened or released to allow the Grooming Arm portion of the device (Element 18) to adjust up or down depending upon the size of the animal being groomed. Element 14 is the Vertically Extending Support Arm of the Swing Arm Assembly. Element 15 is the Lateral Extension Support Bar that connects underneath the rotation means. Element 16 refers to a Locking Lever described above.

Element 18 is the vertical and or horizontal extending piece of the Swing Arm Assembly that either directly connects to an animal or provides a connection means for further items to be used to secure an animal into its position on the top of the table. This element may be referred to herein as the Grooming Arm. This inverted L-shaped element is the actual mechanism that is utilized to secure an animal into its position on the top of the grooming table. The longer vertical leg of the Grooming Arm adjusts up and down through the use of the Adjustment Knob (Element 13), to accommodate the different sizes of animals being groomed. The shorter horizontal leg of the Grooming Arm protrudes over the table top surface and holds the animal into its position on the top of the grooming table. The animal is secured to the shorter horizontal leg of the Grooming Arm through the use of a noose or loop (Element 24) that goes around an animal's neck to help hold it in place during the grooming process, and attaches to a hole in the end of this shorter leg.

Element 17 refers to a threaded knob whose only purpose is to keep the Swing Arm Attachment from falling out of the table mounting clamp should the operator unintentionally loosen the clamp knob (Element 6), which is typically utilized to raise/lower the Grooming Arm in the absence of the Swing Arm Attachment.

Element 22 refers to the two bolts that are mounted in the "T" legs of the Clamp Bracket. The purpose of these two bolts is to provide strength and stability to the swing arm apparatus once it is mounted to the table. The bolts are unscrewed until they touch the underside of the table top, then given another turn or so to pre-load the swing arm apparatus so all of the torque applied to the swing arm apparatus by the pulling dog is not absorbed by the swivel pin (Element 11) as a rotational torque that would bend the pin, but is distributed between Element 11 and Elements 22, creating a pulling torque on the pin.

FIGS. 7A-7I show the aforementioned and described embodiment assembled and secured in place to the edge of a table.

FIGS. 8A-8B show the aforementioned and described embodiment assembled and secured to a table. The arrow indicates the ability of the device to swing and rotate from a first position as shown to a second position as shown. The device is not necessarily shown at its maximal rotation point, rotates in both directions although only one is shown for the purposes of this example, and may stop and be locked into position at several points along its rotation curve.

For the purposes of describing and defining the present invention it is noted that the use of relative terms such as "substantially", "generally", "approximately" and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act or instruction used in this description should be construed as important, necessary, critical or essential to the invention unless explicitly described as such. Although only a few of the exemplary embodiments have been described in detail herein and those skilled in the art will readily appreciate that many modifications are possible in these exemplary embodiments without materially departing from the novel teachings and advantages of this invention. Accordingly all such modifications are intended to be included within the scope of this invention.

The phrase "in one embodiment" is used repeatedly. The phrase generally does not refer to the same embodiment; however, it may. The terms "comprising" "having" and "including" are synonymous, unless the context dictates otherwise. The following illustrations of various embodiments use particular terms by way of example to describe the various embodiments, but this should be construed to encompass and provide for terms such as "method" and "routine" and the like.

Various aspects of the illustrative embodiments will be described using terms commonly employed by those skilled in the art to convey the substance of their work to others skilled in the art. However, it will be apparent to those skilled in the art that the embodiments described herein may be practiced with only some of the described aspects. For purposes of explanation, specific numbers, materials and configurations are set forth in order to provide a thorough understanding of the illustrative embodiments. However, it will be apparent to one skilled in the art that the embodiments described herein may be practiced without the specific details. In other instances, well-known features are omitted or simplified in order not to obscure the illustrative embodiments.

The characteristics and utilities of the present invention described in this summary and the detailed description below are not all inclusive. Many additional features and advantages will be apparent to one of ordinary skill in the art given the following description. There has thus been outlined, rather broadly, the more important features of the invention in order that the detailed description thereof that follows may be better understood, and in order that the present contribution to the art may be better appreciated.

In this respect, by explaining at least one embodiment of the invention in detail, it is to be understood that the invention is not limited in its application to the details of construction and to the arrangements of the components set forth in the description. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the description be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, nor is it intended to be limiting as to the scope of the invention in any way. The characteristics and utilities of the present invention described in this summary and the detailed description below are not all inclusive. Many additional features and advantages will be apparent to one of ordinary skill in the art given the detailed description.

The invention claimed is:

1. An animal grooming system comprising: an animal grooming device and a table, said animal grooming device comprising:
   an upper lateral running extension extends over an upper surface of the table;
   a lower or underside lateral extension extends from underneath the table;

a vertical running support piece or beam connects the upper lateral running extension and the lower or underside lateral extension;

a vertical support and a platform that connect to the lower or underside lateral extension and provide underside support and come into contact with a lower surface of the table;

a clamp knob for raising and lowering a grooming arm;

a threaded knob to keep the upper lateral running extension, the vertical running support piece or beam, and the lower or underside lateral extension from falling out of the table should the operator unintentionally loosen the clamp knob;

a vertical arm held in place by the clamp knob and to provide an attachment of the grooming device to the table;

a lateral support bar that connects to vertical arm, and includes a hole that defines a pivot point on the grooming device, wherein the pivot point of the animal grooming device is closer to a midpoint of the table than it is to an attachment point of the grooming device to the table;

a T-bar support perpendicularly attached to the lateral support bar in a "T" arrangement;

bolts mounted to the T-bar support to provide strength and stability;

rotation means comprising a lower disc and an upper disc, the upper disc having locking grooves, openings, slots, or inserts;

a central connection piece to hold the lower disc and the upper disc together or within a certain proximity of each other;

a vertically extending support arm to function as a receiver to accept and hold the grooming arm portion;

a lateral extension support bar connects to the vertically extending support arm and located underneath the rotation means;

a locking lever attached to the lateral extension support bar and the vertically extending support arm;

a grooming arm portion adapted to either directly connects to an animal or provides a connection means for further items to be used to secure the animal into its position on a top of the table;

an adjustment knob to allow the grooming arm portion to adjust up or down depending upon a size of the animal being groomed.

2. The system of claim 1, wherein the lower and upper discs, each includes a surface texture enabling the discs to slide along each other when in contact.

3. The system of claim 2, wherein the surface texture is comprised of high-density polyethylene.

4. The system of claim 1, wherein an animal loop secured to the grooming device atop the table and is configured to stay in a single position during the animal grooming device's full range of use.

5. The system of claim 4, wherein the animal loop is any of a collar, grooming noose, or grooming loop.

* * * * *